(12) United States Patent
Salamon et al.

(10) Patent No.: US 8,645,584 B2
(45) Date of Patent: Feb. 4, 2014

(54) METHOD AND SYSTEM FOR PARTIAL USB ENUMERATION AND EDGE INITIATION

(75) Inventors: Aviv Salamon, Raanana (IL); Eyran Lida, Kfar Ha-Oranim (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 199 days.

(21) Appl. No.: 13/354,290

(22) Filed: Jan. 19, 2012

(65) Prior Publication Data

US 2012/0117278 A1 May 10, 2012

Related U.S. Application Data

(63) Continuation-in-part of application No. 13/169,877, filed on Jun. 27, 2011.

(60) Provisional application No. 61/358,917, filed on Jun. 27, 2010, provisional application No. 61/434,431, filed on Jan. 19, 2011, provisional application No. 61/435,375, filed on Jan. 24, 2011.

(51) Int. Cl.
*G06F 3/00* (2006.01)
*G06F 13/00* (2006.01)

(52) U.S. Cl.
USPC ............. 710/8; 710/2; 710/5; 710/11; 710/15

(58) Field of Classification Search
None
See application file for complete search history.

(56) References Cited

U.S. PATENT DOCUMENTS

| | | |
|---|---|---|
| 6,898,660 B2 | 5/2005 | Engler |
| 7,418,524 B2 | 8/2008 | Beasley et al. |
| 7,502,878 B1 | 3/2009 | Wright |
| 7,587,536 B2 | 9/2009 | McLeod |
| 7,644,211 B2 | 1/2010 | Toebes et al. |
| 7,769,941 B2 | 8/2010 | Huang et al. |
| 7,797,474 B2 | 9/2010 | Ulenas |
| 2005/0138229 A1 | 6/2005 | Sartore |
| 2007/0245058 A1 | 10/2007 | Wurzburg et al. |
| 2007/0255883 A1 | 11/2007 | Ulenas |
| 2007/0294456 A1 | 12/2007 | Chan et al. |
| 2010/0042767 A1* | 2/2010 | McLeod ........................ 710/300 |
| 2010/0272102 A1* | 10/2010 | Kobayashi ..................... 370/389 |

\* cited by examiner

*Primary Examiner* — Scott Sun

(57) ABSTRACT

Initiating USB-over-network connections based on partial USB enumeration, including the steps of: Discovering USB hosts by respective USB host adaptors (USBHs). Reading USB device descriptors of USB devices by respective USB device adaptors (USBDs) performing partial USB enumeration that stops prior to the configuration state of the USB devices. Forwarding the read USB device descriptors to the USBHs. And initiating, by the USBDs or the USBHs and based on the USB device descriptors, USB-over-network connections between the USB devices and the USB hosts.

25 Claims, 27 Drawing Sheets

METHOD AND SYSTEM FOR PARTIAL USB ENUMERATION AND EDGE INITIATION

CROSS-REFERENCE TO RELATED APPLICATIONS

This application is a Continuation In Part of U.S. application Ser. No. 13/169,877, filed Jun. 27, 2011, which claims the benefit under 35 U.S.C. 119(e) of U.S. Provisional Patent Application No. 61/358,917, filed Jun. 27, 2010. This application also claims the benefit of U.S. Provisional Patent Application No. 61/434,431, filed Jan. 19, 2011, and U.S. Provisional Patent Application No. 61/435,375, filed Jan. 24, 2011.

BACKGROUND

The Universal Serial Bus (USB) 2.0 specification defines the communication between one USB host and up to 127 USB devices connected in a tiered-star topology. USB hubs are included in the tiers, allowing branching into a tree structure with up to five tier levels. A USB host may have multiple host controllers, and each host controller may provide one or more USB ports. The USB devices are linked in series through hubs, and the USB host manages the bus.

When a USB device is first connected to a USB host, the USB device enumeration process is started. The enumeration starts by sending a reset signal to the USB device. The data rate of the USB device is determined during the reset signaling. After reset, the USB device's information is read by the host and the device is assigned a unique seven-bit address. If the device is supported by the host, the device drivers needed for communicating with the device are loaded and the device is set to a configured state. If the USB host is restarted, the enumeration process is repeated for all connected devices. The host controller directs traffic flow to devices, so no USB device can transfer any data on the bus without an explicit request from the host controller. In USB 2.0, the host controller polls the bus for traffic, usually in a round-robin fashion.

The USB standard is limited to 5 meter long cables, and other known solutions do not operate over a network having multiple USB hosts and distributed control. Therefore, there is a need for a network having multiple USB hosts, multiple USB devices, edge initiating of USB connections, edge addressing of USB packets, bandwidth allocation, and/or combinations thereof.

BRIEF SUMMARY

In one embodiment, a method for initiating a USB-over-network connection based on partial USB enumeration, comprising: discovering first and second USB hosts by respective first and second USB host adaptors (USBHs); reading USB device descriptors of first and second USB devices by respective first and second USB device adaptors (USBDs) performing partial USB enumeration that stops prior to the configuration state of the USB devices; forwarding the read USB device descriptors to both the first and second USBHs, wherein the USBDs and the USBHs communicate over a network which can connect each USBD with each USBH; initiating, by the first USBD or the first USBH, a first USB-over-network connection between the first USB device and the first USB host, via the first USBH and the first USBD, and based on the USB device descriptors; and initiating, by the second USBD or the second USBH, a second USB-over-network connection between the second USB device and the second USB host, via the second USBH and the second USBD, and based on the USB device descriptors.

In one embodiment, a network configured to initiate a USB-over-network connection based on partial USB enumeration, comprising: first and second USB host adaptors (USBHs) configured to discover first and second USB hosts, respectively; first and second USB device adaptors (USBDs) configured to read USB device descriptors of first and second USB devices, respectively, by performing partial USB enumeration that stops prior to the configuration state of the USB devices; the first and second USB device adaptors (USBDs) further configured to forward the USB device descriptors to both the first and second USBHs, wherein the USBDs and the USBHs communicate over a network which can connect each USBD with each USBH; the first USBD or the first USBH configured to initiate a first USB-over-network connection between the first USB device and the first USB host, via the first USBH and the first USBD, and based on the USB device descriptors; and the second USBD or the second USBH configured to initiate a second USB-over-network connection between the second USB device and the second USB host, via the second USBH and the second USBD, and based on the USB device descriptors.

BRIEF DESCRIPTION OF THE DRAWINGS

The embodiments are herein described, by way of example only, with reference to the accompanying drawings. In the drawings.

DETAILED DESCRIPTION

Figure 1:
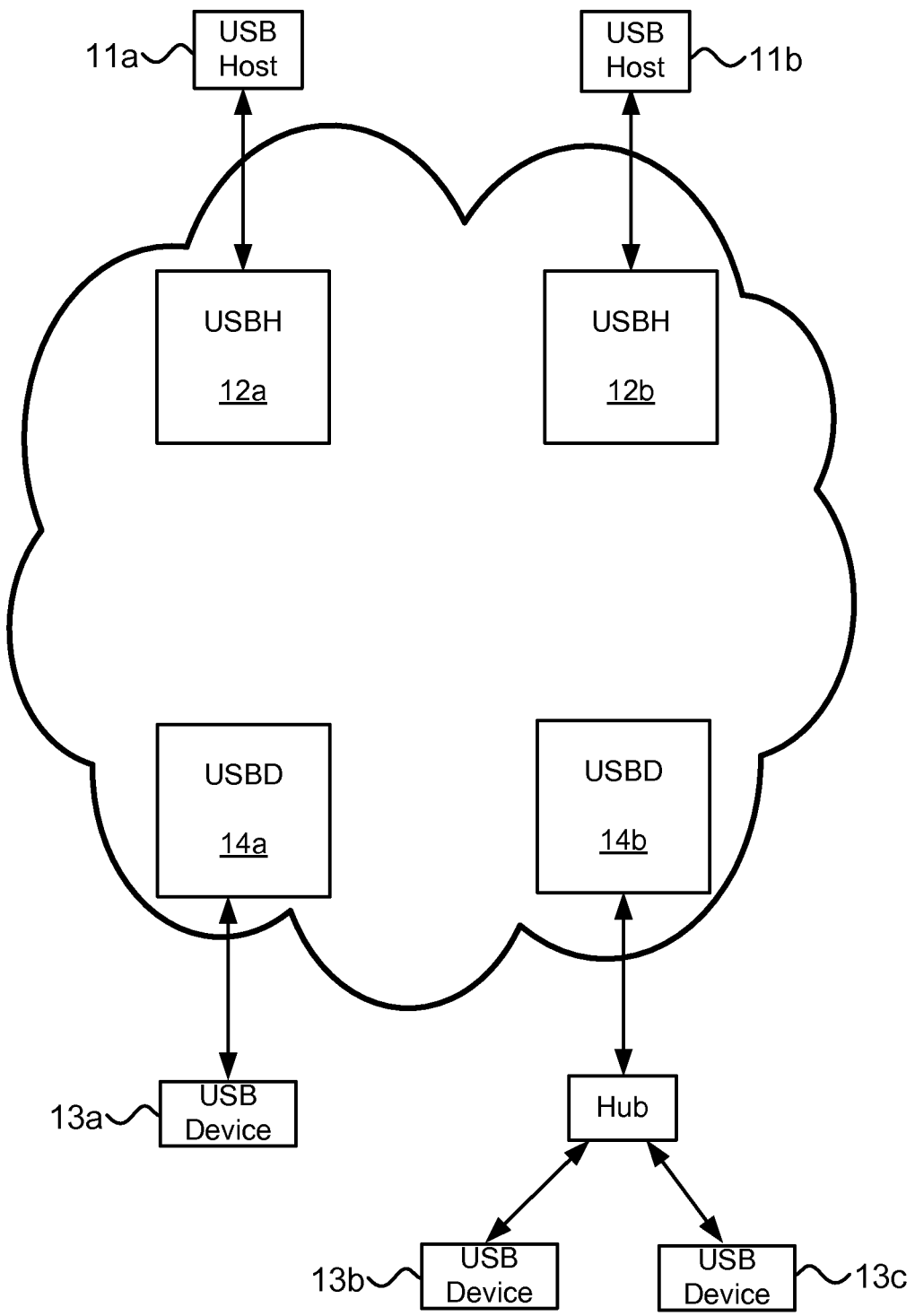
FIG. 1 illustrates a multi host USB network in accordance with some of the disclosed embodiments.

FIG. 1 illustrates a multi host USB network in accordance with some of the disclosed embodiments. The USB network, designated by the cloud, includes multiple USB Host adaptors (USBH) 12a and 12b, and USB Device adaptors (USBD) 14a, 14b. In one embodiment, the characteristics of the USB network are similar to the characteristics of the Ethernet network. In one embodiment, the USB network is implemented over an Ethernet network. Optionally, USB devices 13a, 13b, and 13c are connected to the USB network via the USBDs, and several USB devices may be connected to the same USBD via a standard USB hub. Optionally, USB hosts 11a, 11b are connected to the USB network via the USBH. The USB network provides multiple point-to-multipoint connections, where a single USB host can connect to several USB devices over the USB network. In some embodiments, a USB device can only be connected to a single host at a given time.

In some embodiments, the USBH adaptor has from the network side at least one RJ45 port, and from the USB host side a single USB upstream port, designed to be connected to the USB Host. The USBD adaptor has from the network side at least one RJ45 port, and from the USB device side at least one downstream port, designed to be connected to the USB device(s), where the USB device may optionally be a hub. The hub may be connected to multiple USB devices, some of which may be hubs themselves. A USBD may connect different USB devices to different USBHs. The USBH is connected to a USB host may present itself as a standard USB 2.0 hub with multiple ports. When a device connected to a USBD is to be connected to the USB host, the USBH acts towards the USB host as if the device is connected to one of its ports.

In one embodiment, the USB network comprises several USB devices at different locations over the network and several USB hosts at different locations over the network. Each USB host is aware of both (i) the various USB devices existing over the network, which may or may not be available for USB connections, and (ii) the subset of existing devices that are also available for USB connections. In one embodiment the USBH or the USBD delivers the information to the USB host via a software client, such as a device driver.

In some embodiments, predefined connections may be set automatically by grouping a predefined USBH with one or more predefined USBD adaptors, such that when a connection is created between said adaptors, the USB host connected to the USBH and the USB devices connected to the USBD will be connected.

In some embodiments, a USBH is associated with a different interface adapter (such as video source) and the USBD is associated with another adapter (such as video sink). When the video source and sink are connected, the USBH and USBD are connected automatically such that all devices connected to the USBD are connected to the USB host connected to the USBH. In one embodiment, the USBH is associated with a video source which is also a USB host and the USBD is associated with a video sink. When the video source and sink are connected, the USBH and USBD are also connected automatically such that all devices connected to the USBD, in particular control devices such as a keyboard, mouse, or gamepad are connected to the USB host that is connected to the USBH in order to control the video source.

In another embodiment, a default USBH host is defined for each USBD. The default USBH is responsible to generate the connection to its default devices, while the USBD acts as a host to new USB devices and enumerates the USB devices to the address state by giving them local addresses. In this embodiment, the default USBH may decide: (i) to do nothing with new USB devices, (i) to assign the new USB devices to itself, or (iii) to assign the new USB devices to another USBH.

Figure 2A:
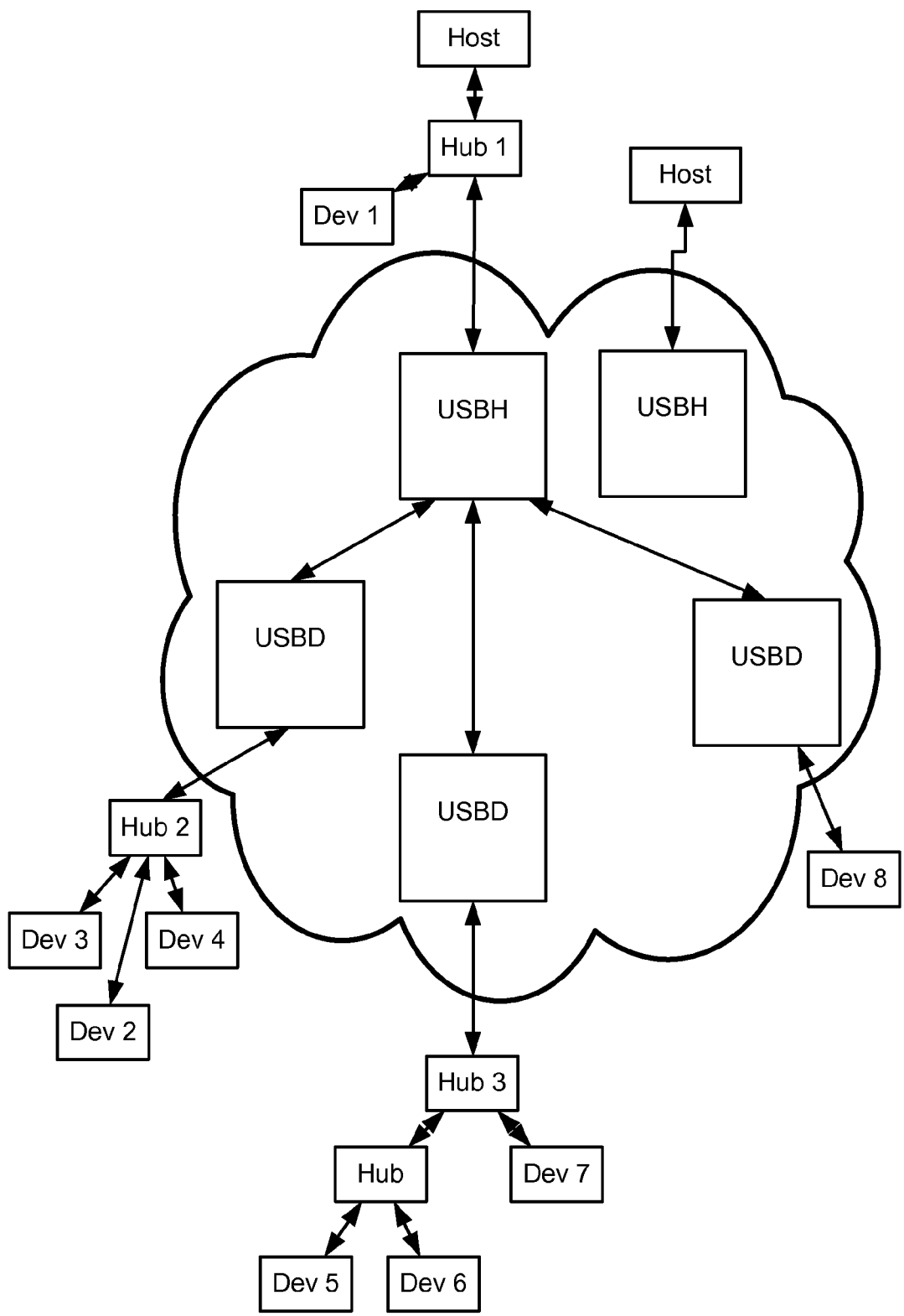
FIG. 2A illustrates a multi-tier example of a USB network in accordance with one embodiment.
Figure 2B:
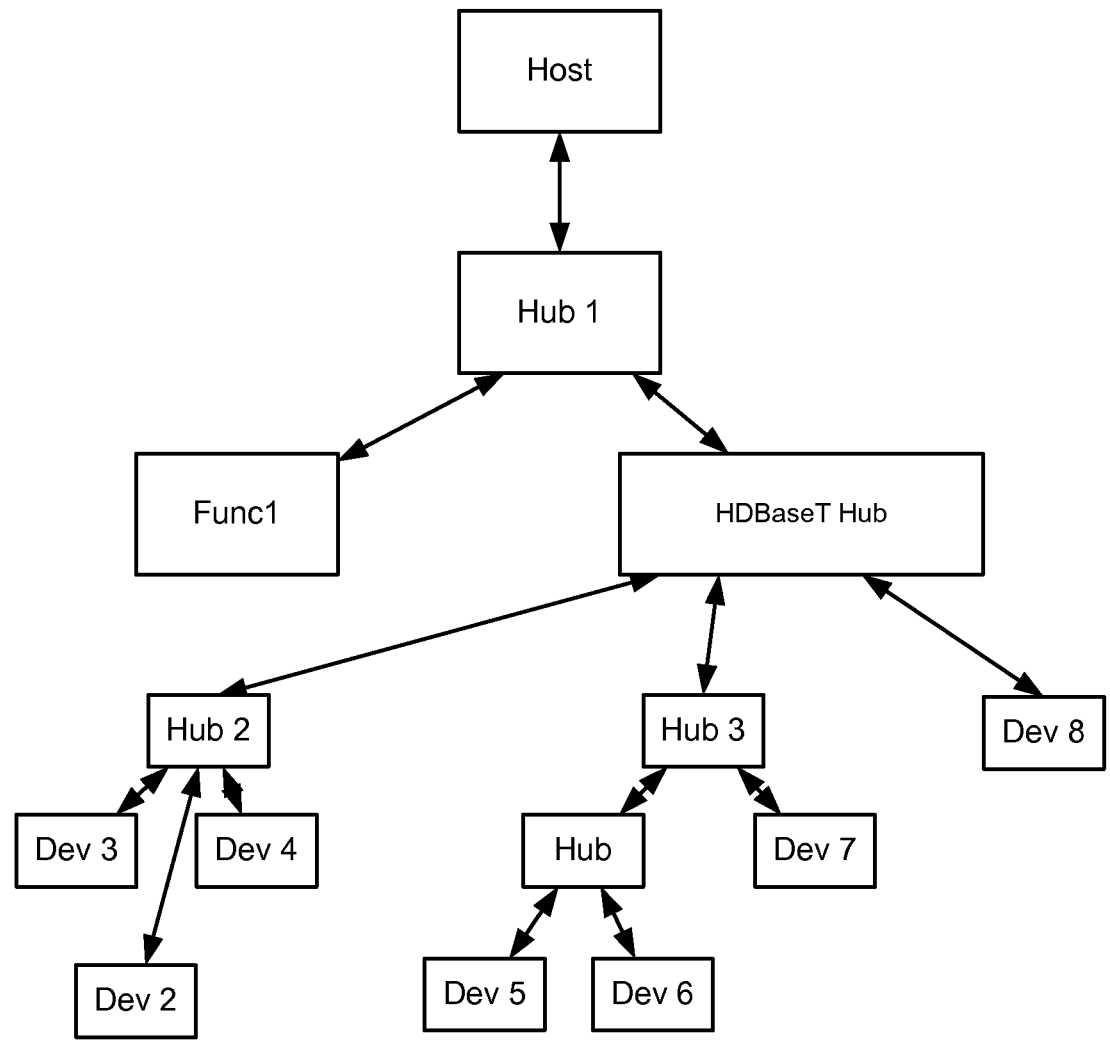
FIG. 2B illustrates a flattened version of the USB network illustrated in FIG. 2A.

In one embodiment, the USB network is flattened into a single tier by providing the USB Host with a network view that represents the USBH with all connected USBDs as a single hub. For example, FIG. 2A illustrates a multi-tier example of a USB network in accordance with the invention, while FIG. 2B illustrates a flattened version of the same USB network. In one embodiment, a user of the USB network is able to see all USB hosts and devices in the entire USB network and make connections between USBHs and USBDs or USBHs and specific USB devices connected to USBDs.

Figure 3:
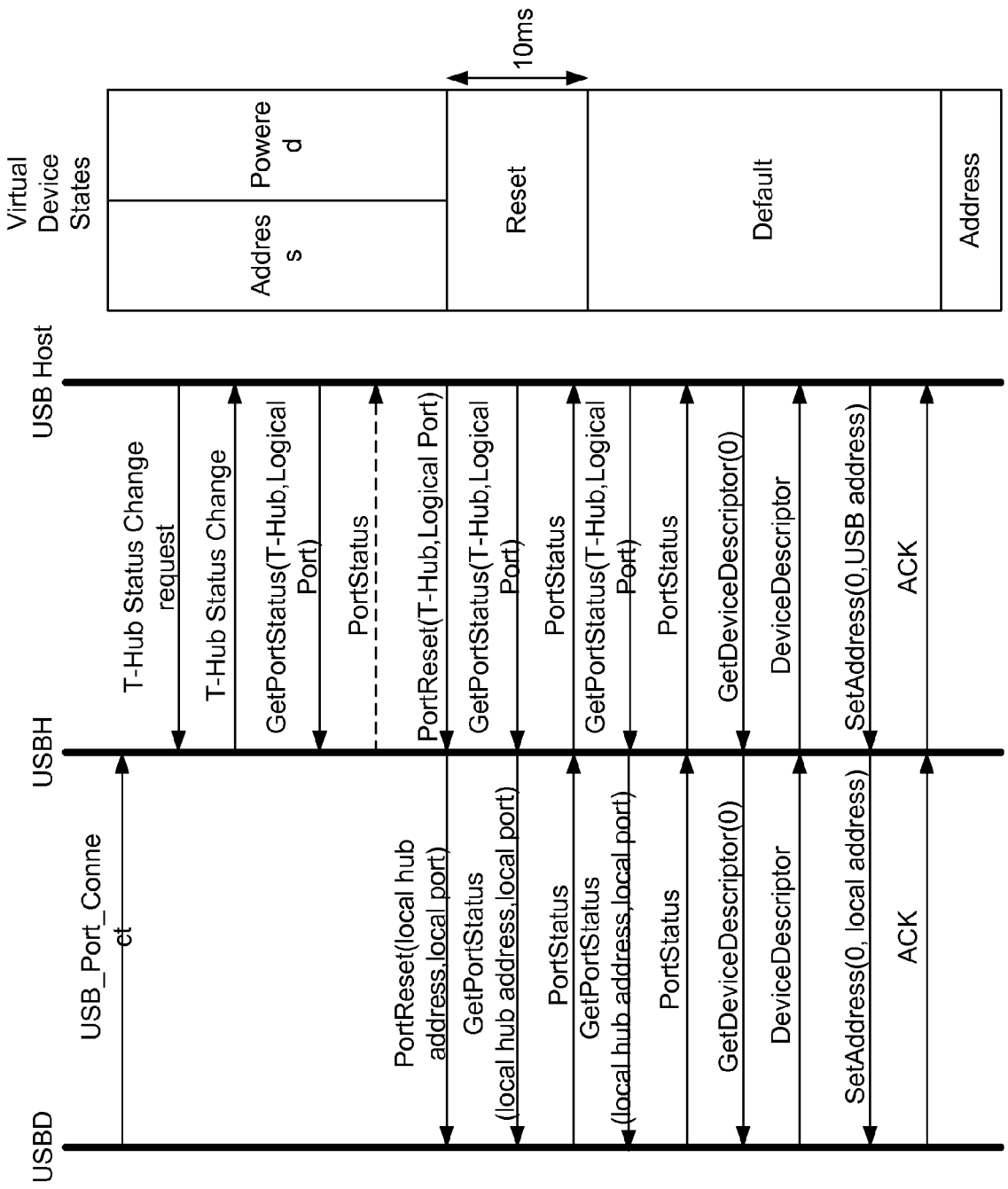
FIG. 3 illustrates a USB connection between a USB device and a USB host.

FIG. 3 illustrates a USB connection between a USB device and a USB host. Until the first dashed "PortStatus", the hub announces a USB host that it is connected to a USB device. From the "PortReset", the USB devices are enumerated because the host assumes it is connected directly to the USB devices. In order for a USBD to be able to present to a control point information about USB devices connected to it, the USBD should start device enumeration up to the Address State. Then the control point should be able to retrieve USB descriptors from the devices via network messages. Thus, the USBD features the functionality of a USB host and it enumerates USB devices and manages the USB bus connected to the USB devices.

In one example, a method for connecting a device located at a USBD to a USB host located at a USBH includes the following steps: (i) Creating a network session, or updating an existing network session between the USBD and USBH; (ii) Sending, by the USBD to the USBH, A USB_Device_Connect message; and (iii) Assigning, by the USBH, a logical port to the new USB device and re-enumerating the USB device to the USB host as if it is connected to a hub.

Figure 4A:
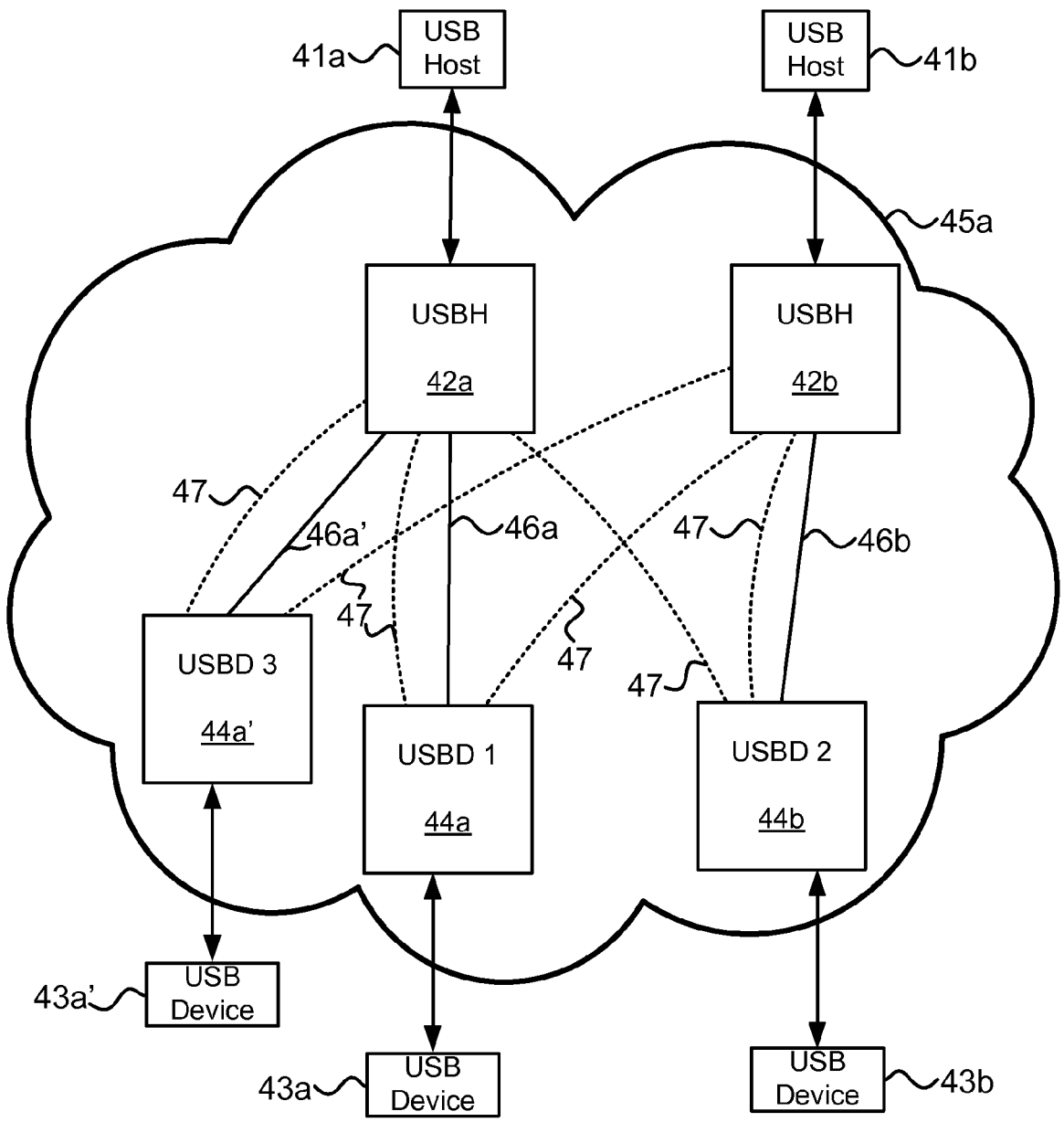
FIG. 4A illustrates one embodiment for connecting USB devices with USB hosts over distinct network data plane.
Figure 5A:
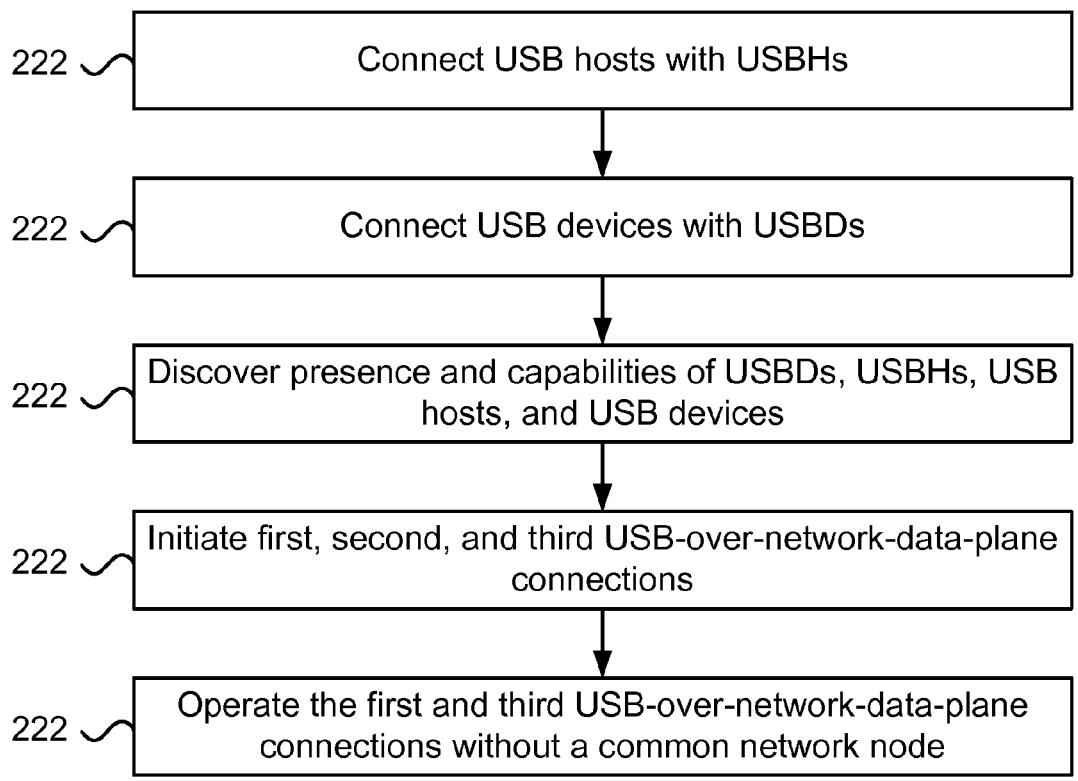
FIG. 5A illustrates one flow diagram for connecting USB devices with USB hosts over distinct network data plane.

FIG. 4A and FIG. 5A illustrate two related embodiments for connecting USB devices with USB hosts over distinct network data plane. One of the embodiments includes the following steps: In step 5*a*1, connecting first and second USB hosts 41*a*, 41*b* with respective first and second USBHs 421, 42*b*. The USB hosts communicate with their respective USBHs essentially according to USB specification timings, and optionally, are connected via standard USB cables. In step 5*a*2, connecting first, second, and third USB devices with respective first, second, and third USBDs. The USB devices communicate with their respective USBDs essentially according to USB specification timings, and optionally, are connected via standard USB cables. In step 5*a*3, the USBDs and the USBHs communicate over a network 45*a* which can connect each USBD with each USBH. The network may include network control plane 47 and network data plane 46*a*, 46*a*', and 46*b*. The network control plane, illustrated by 46*a* and 46*b*, is used for discovering presence and capabilities of the USBDs, the USBHs, the USB hosts, and the USB devices. The network data plane transports USB data between connected USBDs and USBHs. In step 5*a*4, at least three connections are initiated. For example, initiating first USB-over-network-data-plane connections from the first USB host 41*a* to the first USB device 43*a*, via the first USBH 42*a* and the first USBD 44*a*; initiating second USB-over-network-data-plane connections from the first USB host 42*a* to the second USB devices 43*a*', via the first USBH 42*a* and the second USBD 44*a*'; and initiating a third USB-over-network-data-plane connection from the second USB host 41*b* to the third USB device 43*b*, via the second USBH 42*b* and the third USBD 44*b*. And in step 5*a*5, operating the first and third USB-over-network-data-plane connections essentially simultaneously and without any common network node. In one example, to say that the first and third USB-over-network-data-plane connections operate essentially simultaneously and without any common network node meaning that the first and second USB hosts are non-collocated USB hosts, the first and second USBHs are non-collocated USBHs, the first and third USB devices are non-collocated USB devices, and the first and third USBDs are non-collocated USBDs.

Still referring to FIG. 4A, the embodiment may further include disconnecting the first and third USB-over-network-data-plane connections, initiating a fourth USB-over-network-data-plane connection between the first USB device 43*a* and the second USB host 42*b*, and initiating a fifth USB-over-network-data-plane connection between the third USB device 43*b* and the first USB host 42*a*. The fourth and fifth USB-over-network-data-plane connections may operate essentially simultaneously and without any common network node. Optionally, the network may guarantee maximum network latency variation below a first predefined value, and may guarantee maximum round trip latency over the network data plane below a second predefined value. Optionally, the embodiment may further include connecting the USB devices with the respective USBDs without connecting the USB devices with any of the USB hosts. at least one of the USB-over-network-data-plane connections is transmitted over a cable longer than 5 m. Optionally, the network is an HDBaseT network. Optionally, the network is a packet switching network. Optionally, the embodiment may further include maintaining fixed network paths for the USB-over-network-data-plane connections. Optionally, the network guarantees throughput of the USB-over-network-data-plane connections. Optionally, the embodiment may further include utilizing the network control plane for standby and wakeup transitions. Optionally, the embodiment may further include utilizing the network control plane for initiating the first USB-over-network-data-plane connection. In this case, the topologies of the network control plane and the network data plane may not be the same for the first USB-over-network-data-plane connection. Optionally, the embodiment may further include utilizing the network control plane for setting the USB-over-network-data-plane connections. It is noted that the network control plane may not match exactly the network data plane in terms of network topology and/or other network characteristics. Furthermore, a USBD and a USBH are considered to be connected when a USB-over-the-network connection exists between them. Optionally, the network guarantees maximum network latency variation below 50 microseconds. Optionally, the network guarantees maximum round-trip latency over the network data plane below 200 microseconds. Optionally, the network provides fixed network paths for the USB-over-network-data-plane connections. In this case, the network may operate like a single network even when it is composed of two or more sub-networks. In addition to the fixed network paths, the network may guarantee maximum network latency variation below 50 microseconds, and/or may guarantee maximum round-trip latency below 200 microseconds over the network data plane. Optionally, the network may guarantee throughput of the USB-over-network-data-plane connections. In addition to the throughput, the network may guarantee maximum network latency variation below 50 microseconds, and/or may guarantee maximum round-trip latency below 200 microseconds over the network data plane.

Figure 4B:
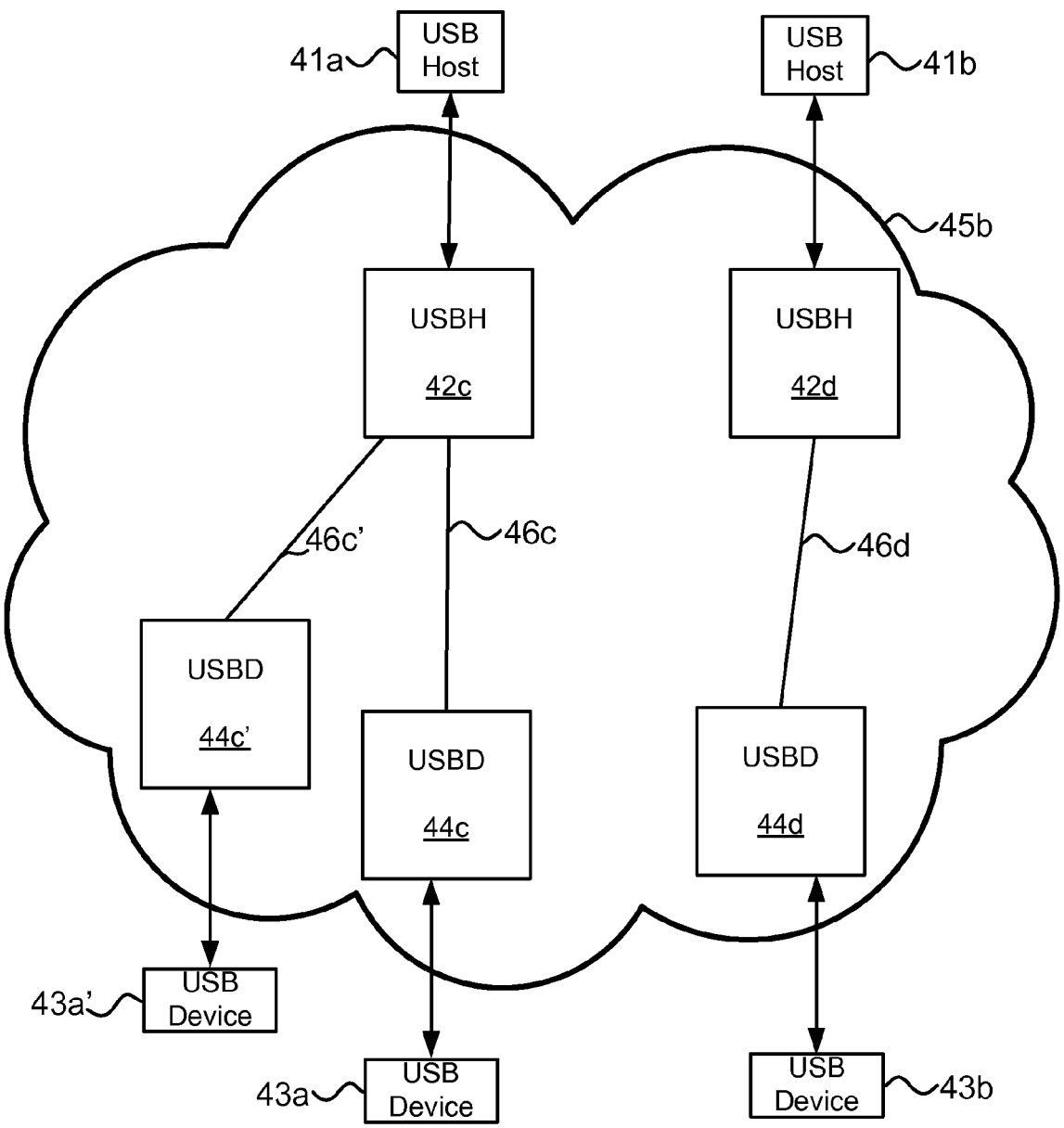
FIG. 4B illustrates one embodiment for connecting USB devices with USB hosts over distinct network paths.
Figure 5B:
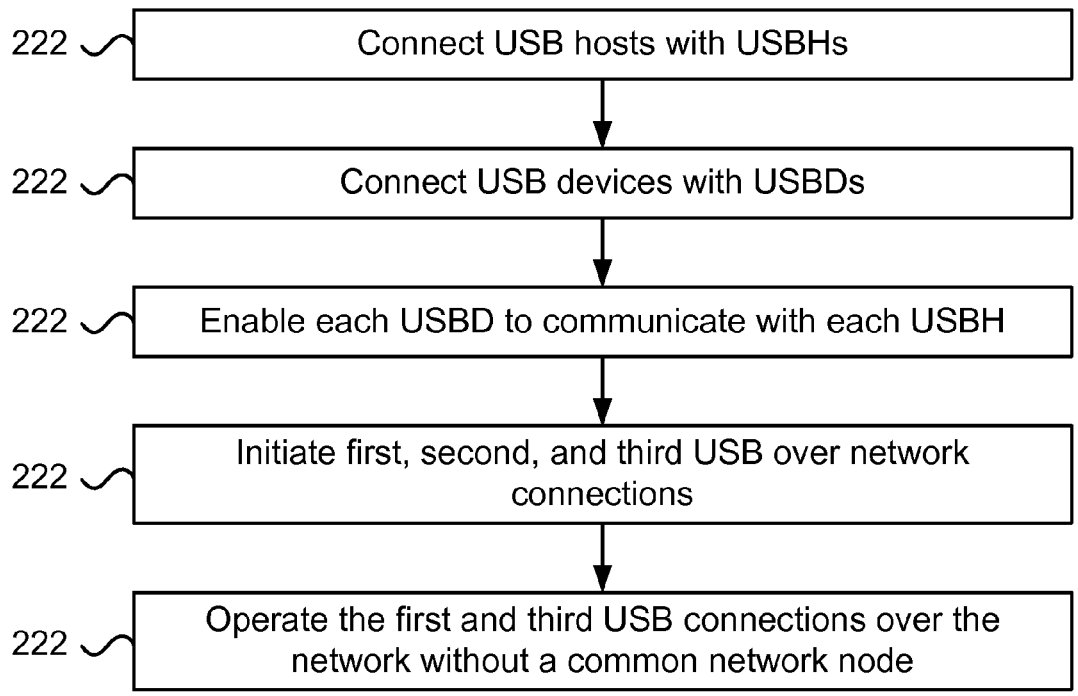
FIG. 5B illustrates one flow diagram for connecting USB devices with USB hosts over distinct network paths.

FIG. 4B and FIG. 5B illustrate two related embodiments for connecting USB devices with USB hosts over distinct network paths. One of the embodiments includes the following steps: In step 5*b*1, connecting first and second USB hosts 41*a*, 41*b* with respective first and second USB host adaptors (USBHs) 42*c*, 42*d*. The USB hosts communicate with their respective USBHs essentially according to USB specification timings. In step 5*b*2, connecting first, second, and third USB devices 43*a*, 43*a*', and 43*b* with respective first, second, and third USB device adaptors (USBDs) 44*c*, 44*c*', and 44*d*, essentially according to USB specification timings. In step 5*b*3, enabling the USBDs and the USBHs to communicate 46*c*, 46*c*', and 46*d* over a network 45*b* which can connect each USBD with each USBH. In step 5*b*4, at least three connections are initiated. For example, initiating a first USB connection over the network between the first USB device 43*a* and the first USB host 41*a*, via the first USBH 42*c* and the first USBD 44*c* and over at least one cable longer than 5 m; initiating a second USB connection over the network between the second USB device 43*a*' and the first USB host 41*a*, via the first USBH 42*c* and the second USBD 44*c*'; and initiating a third USB connection over the network between the third USB device 43*b* and the second USB host 41*b*, via the second USBH 42*d* and the third USBD 44*d*. And in step 5*b*5, operating the first and third USB connections over the network essentially simultaneously and without any common network node.

Still referring to FIG. 4B, the embodiment may further include disconnecting the first and third USB connections over the network, initiating a fourth USB connection over the network between the first USB device 43*a* and the second USB host 41*b*, and initiating a fifth USB connection over the network between the third USB device 43*b* and the first USB host 41*a*. The fourth and fifth USB connections over the network may operate essentially simultaneously and without any common network node. Optionally, the network may guarantee maximum network latency variation below a first predefined value, and may guarantee maximum round trip latency over the network below a second predefined value. Optionally, the embodiment may further include connecting the USB devices with the respective USBDs without connecting the USB devices with any of the USB hosts. Optionally, the network is an HDBaseT network. Optionally, the network is a packet switching network. Optionally, the embodiment may further include maintaining fixed network paths for the USB connections over the network. In addition to the fixed network paths, the network may guarantee maximum network latency variation below 50 microseconds, and/or may guarantee maximum round-trip latency below 200 microseconds. Optionally, the network may guarantee the throughput of the USB connections over the network. In addition to the throughput, the network may guarantee maximum network latency variation below 50 microseconds, and maximum round-trip latency below 200 microseconds.

Figure 4C:
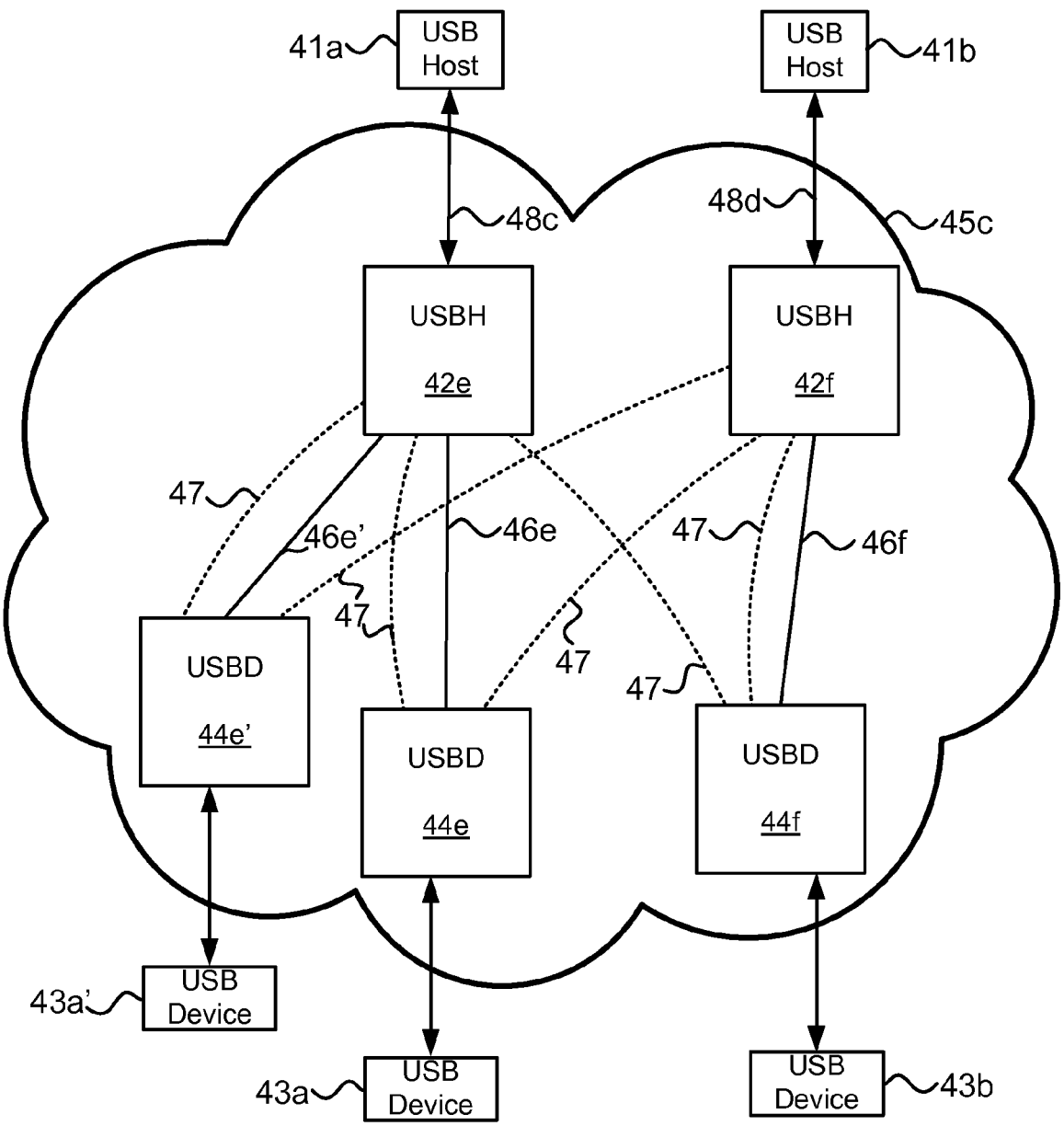
FIG. 4C illustrates one embodiment for connecting USB devices with USB hosts over a network supporting distributed initiations of USB connections over the network.
Figure 5C:
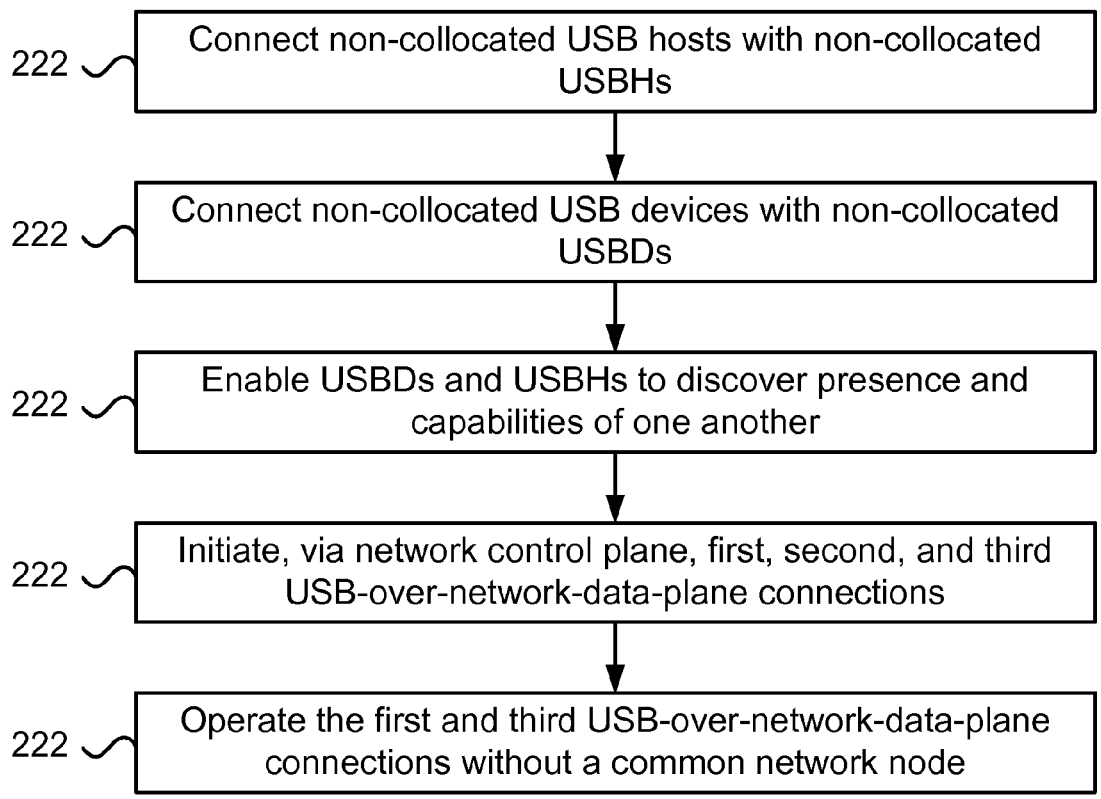
FIG. 5C illustrates one flow diagram for connecting USB devices with USB hosts over a network supporting distributed initiations of USB connections over the network.

FIG. 4C and FIG. 5C illustrate two related embodiments for connecting USB devices with USB hosts over a network supporting distributed initiations of USB connections over the network. One of the embodiments includes the following steps: In step 5c1, connecting first and second non-collocated USB hosts 41a, 41b with respective first and second non-collocated USBHs 42e, 42f. The USB hosts communicate with their respective USBHs essentially according to USB specification timings. In step 5c2, connecting first, second, and third non-collocated USB devices 43a, 43a', and 43b with respective first, second, and third non-collocated USBDs 44e, 44e', and 44f, essentially according to USB specification timings. In step 5c3, enabling the USBDs and the USBHs to communicate over the network 45c. The network may include network control plane and network data plane, wherein the network control plane enables the USBDs and the USBHs to discover presence and capabilities of one another. In step 5c4, at least three connections are initiated. For example, initiating, by the first USBD 44e or the first USBH 42e, via the network control plane, a first USB-over-network-data-plane connection between the first USB device 43a and the first USB host 41a, via the first USBH 42e and the first USBD 44e; Initiating, by the second USBD 44e' or the first USBH 42e, via the network control plane, a second USB-over-network-data-plane connection between the second USB device 43a' and the first USB host 41a, via the first USBH 42e and the second USBD 44e'; And initiating, by the third USBD 44f or the second USBH 42f, via the network control plane, a third USB-over-network-data-plane connection between the third USB device 43b and the second USB host 41b, via the second USBH 42f and the third USBD 44f. And In step 5c5, operating the first and third USB-over-network-data-plane connections essentially simultaneously and without any common network node.

Still referring to FIG. 4C, the embodiment may further include terminating the first USB-over-network-data-plane connection, by the first USBD 44e or the first USBH 42e, via the network control plane. Optionally, the network 45c includes at least two hops, and the first USBD 43a is initiating the first USB-over-network-data-plane connection. Alternatively, the network 45c includes at least two hops, and the first USBH 42e is initiating the first USB-over-network-data-plane connection. Optionally, the embodiment may further include connecting the non-collocated USB devices with the respective USBDs without connecting the USB devices with any of the USB hosts. Optionally, at least one of the USB-over-network-data-plane connections is transmitted over a cable longer than 5 m. Optionally, the network is an HDBaseT network. Optionally, the network is a packet switching network. Optionally, the embodiment may further include utilizing the network control plane for initiating the first USB-over-network-data-plane connection, wherein the topologies of the network control plane and the network data plane are not the same for the first USB-over-network-data-plane connection. Additionally or alternatively, the network control plane may be utilized for standby and wakeup transitions. Optionally, the network may guarantee maximum network latency variation below a first predefined value, and may guarantee maximum round trip latency over the network data plane below a second predefined value. Optionally, the network may guarantee maximum network latency variation below 50 microseconds. Optionally, the network may guarantee maximum round-trip latency over the network data plane below 200 microseconds. Optionally, the network may provide fixed network paths for the USB-over-network-data-plane connections. In addition to the fixed network paths, the network may guarantee maximum network latency variation below 50 microseconds. Additionally, the network may guarantee maximum round-trip latency below 200 microseconds over the network data plane. Optionally, the network may guarantee the throughput of the USB-over-network-data-plane connections. In addition to the throughput, the network may guarantee maximum network latency variation below 50 microseconds, and/or may guarantee maximum round-trip latency below 200 microseconds over the network data plane.

Figure 4D:
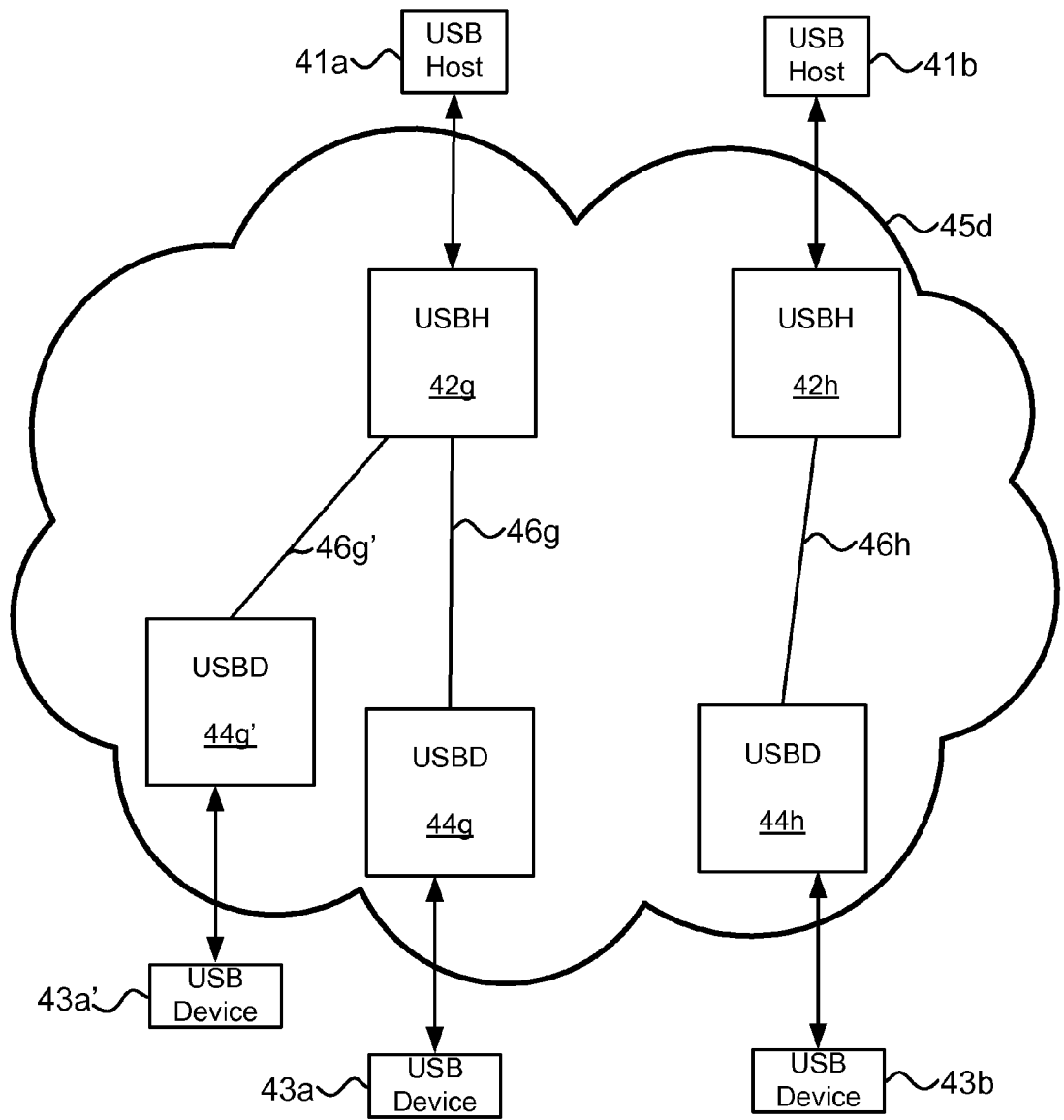
FIG. 4D illustrates one embodiment for initiating, by USB device adaptors, USB connections over a non-USB network.
Figure 5D:
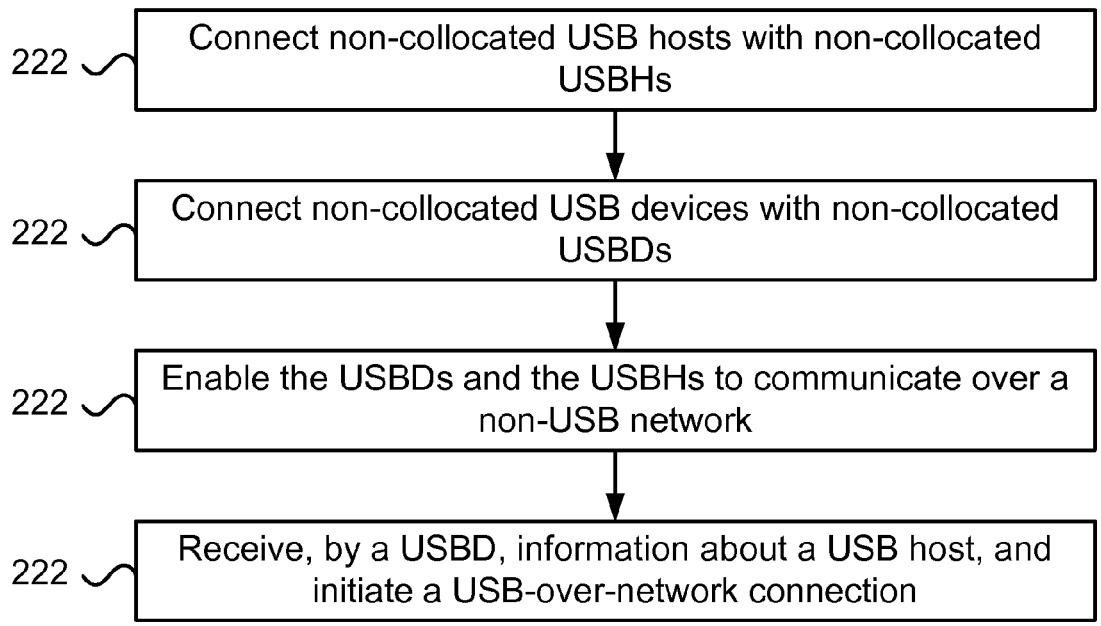
FIG. 5D illustrates one flow diagram for initiating, by USB device adaptors, USB connections over a non-USB network.

FIG. 4D and FIG. 5D illustrate two related embodiments for initiating, by USB device adaptors, USB connections over a non-USB network. One of the embodiments includes the following steps: In step 5d1, connecting first and second non-collocated USB hosts 41a, 41b with respective first and second non-collocated USBHs 42g, 42h. The USB hosts communicate with their respective USBHs essentially according to USB specification timings. In step 5d2, connecting first, second, and third non-collocated USB devices 43a, 43a', and 43b with respective first, second, and third non-collocated USBDs 44g, 44g', and 44h, essentially according to USB specification timings. In step 5d3, enabling the USBDs and the USBHs to communicate over the non-USB network 45d, which enables each USBD to discover presence and capabilities of each USBH. In step 5d4, at least three USB-over-network connections are initiated. For example, receiving, by the first USBD 43a, information about the first USB host 41a; and then initiating, by the first USBD 43a, a first USB-over-network connection between the first USB device 43a and the first USB host 41a, via the first USBH 42g and the first USBD 44g; and receiving, by the second USBD 43a', information about the first USB host 41a; and then initiating, by the second USBD 43a', a second USB-over-network connection between the second USB device 43a' and the first USB host 41a, via the first USBH 42g and the second USBD 44g'; and receiving, by the third USBD 43b, information about the second USB host 41b; and then initiating, by the third USBD 43b, a third USB-over-network connection between the third USB device 43b and the second USB host 41b, via the second USBH 42h and the third USBD 44h.

Still referring to FIG. 4D, the embodiment may further include terminating the first USB-over-network connection by the first USBD 43a. Optionally, the non-USB network 45d includes network control plane and network data plane. The network control plane may be used for initiating the first USB-over-network connection, wherein the topologies of the network control plane and the network data plane may not be the same for the first USB-over-network connection. Optionally, the embodiment may further include disconnecting the first and third USB-over-network connections, initiating a fourth USB-over-network connection between the first USB device 43a and the second USB host 41b, and initiating a fifth USB-over-network connection between the third USB device 43b and the first USB host 41a. Optionally, the fourth and fifth USB-over-network connections operate essentially simultaneously and without any common network node. Optionally, the non-USB network may guarantee maximum network latency variation below a first predefined value, and may guarantee maximum round trip latency over the network below a second predefined value. Optionally, the embodiment may further include receiving by the first USBD 44g the information about the first USB host 41a before connecting to the first USB device 43a. Optionally, at least one of the USB-over-network connections is transmitted over a cable longer than 5 m. Optionally, the non-USB network is an HDBaseT network. Optionally, the non-USB network is a packet switching network. Optionally, the non-USB network may provide fixed network paths for the USB-over-network connections. In addition to the fixed network paths, the non-USB network may guarantee maximum network latency variation below 50 microseconds, and maximum round-trip latency below 200 microseconds. Optionally, the non-USB network may guarantee the throughput of the USB-over-network-data-plane connections. In addition to the throughput, the non-USB network may guarantee maximum network latency variation below 50 microseconds, and maximum round-trip latency below 200 microseconds.

Figure 4E:
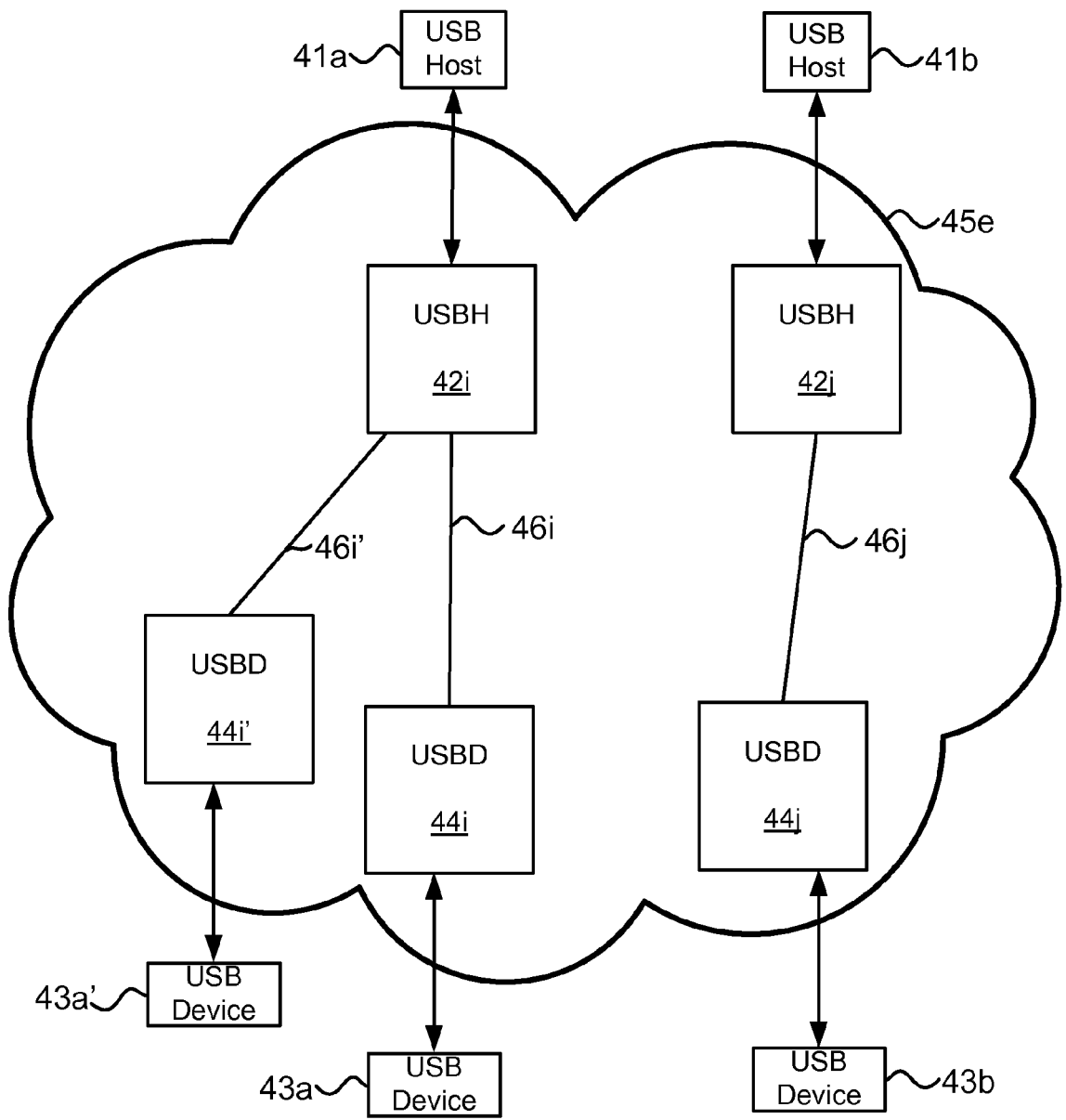
FIG. 4E illustrates one embodiment for initiating, by USB host adaptors, USB connections over a non-USB network.
Figure 5E:
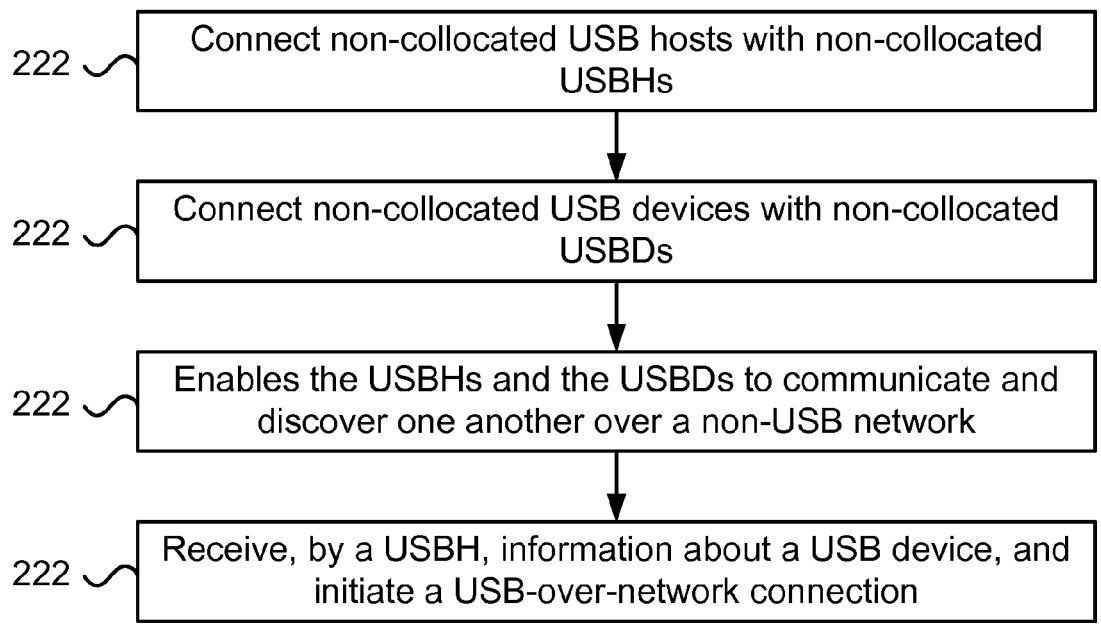
FIG. 5E illustrates one flow diagram for initiating, by USB host adaptors, USB connections over a non-USB network.

FIG. 4E and FIG. 5E illustrate two related embodiments for initiating, by USB host adaptors, USB connections over a non-USB network. One of the embodiments includes the following steps: In step 5e1, connecting first and second non-collocated USB hosts 41a, 41b with respective first and second non-collocated USBHs 42i, 42j. The USB hosts communicate with their respective USBHs essentially according to USB specification timings. In step 5e2, connecting first, second, and third non-collocated USB devices 43a, 43a', and 43b with respective first, second, and third non-collocated USBDs 44i, 44i', and 44j, essentially according to USB specification timings. In step 5e3, enabling the USBHs and the USBDs to communicate over the non-USB network 45e. The non-USB network enables each USBD to discover presence and capabilities of each USBH. In step 5e4, at least three connections are initiated. For example, receiving, by the first USBH 42i, information about the first USB device 43a. Then the first USBH 42i initiate a first USB-over-network connection between the first USB host 41a and the first USB device 43a, via the first USBH 42i and the first USBD 44i; and receiving, by the first USBH 42i, information about the second USB device 43'. Then the first USBH initiate a second USB-over-network connection between the first USB host 41a and the second USB device 43a', via the first USBH 42i and the second USBD 44i; and receiving, by the second USBH 42j, information about the third USB device 43b. Then the second USBH 42j initiate a third USB-over-network connection between the second USB host 41b and the third USB device 43b, via the third USBH 42j and the second USBD 44j.

Still referring to FIG. 4E, the embodiment may further include terminating the first USB-over-network connection by the first USBH 42i. Optionally, the non-USB network includes network control plane and network data plane. The network control plane may be utilized for initiating the first USB-over-network connection. In this case, the topologies of the network control plane and the network data plane may not be the same for the first USB-over-network connection. Optionally, the embodiment may further include disconnecting the first and third USB-over-network connections, initiating a fourth USB-over-network connection between the first USB host 41a and the third USB device 43b, and initiating a fifth USB-over-network connection between the second USB host 41b and the first USB device 43a. The fourth and fifth USB-over-network connections may operate essentially simultaneously and without any common network node. Optionally, the non-USB network 45e may guarantee maximum network latency variation below a first predefined value, and may guarantee maximum round trip latency over the network below a second predefined value. Optionally, the embodiment may further include receiving by the first USBH 42i the information about the first USB device 43a before connecting with first USB host 41a. Optionally, at least one of the USB-over-network connections is transmitted over a cable longer than 5 m. Optionally, the non-USB network is an HDBaseT network. Optionally, the non-USB network 45e is a packet switching network. Optionally, the non-USB network may provide fixed network paths for the USB-over-network connections. In addition to the fixed network paths, the non-USB network may guarantee maximum network latency variation below 50 microseconds, and maximum round-trip latency below 200 microseconds. Optionally, the non-USB network 45e may guarantee the throughput of the USB-over-network-data-plane connections. In addition to the throughput, the non-USB network may guarantee maximum network latency variation below 50 microseconds, and maximum round-trip latency below 200 microseconds.

Figure 4F:
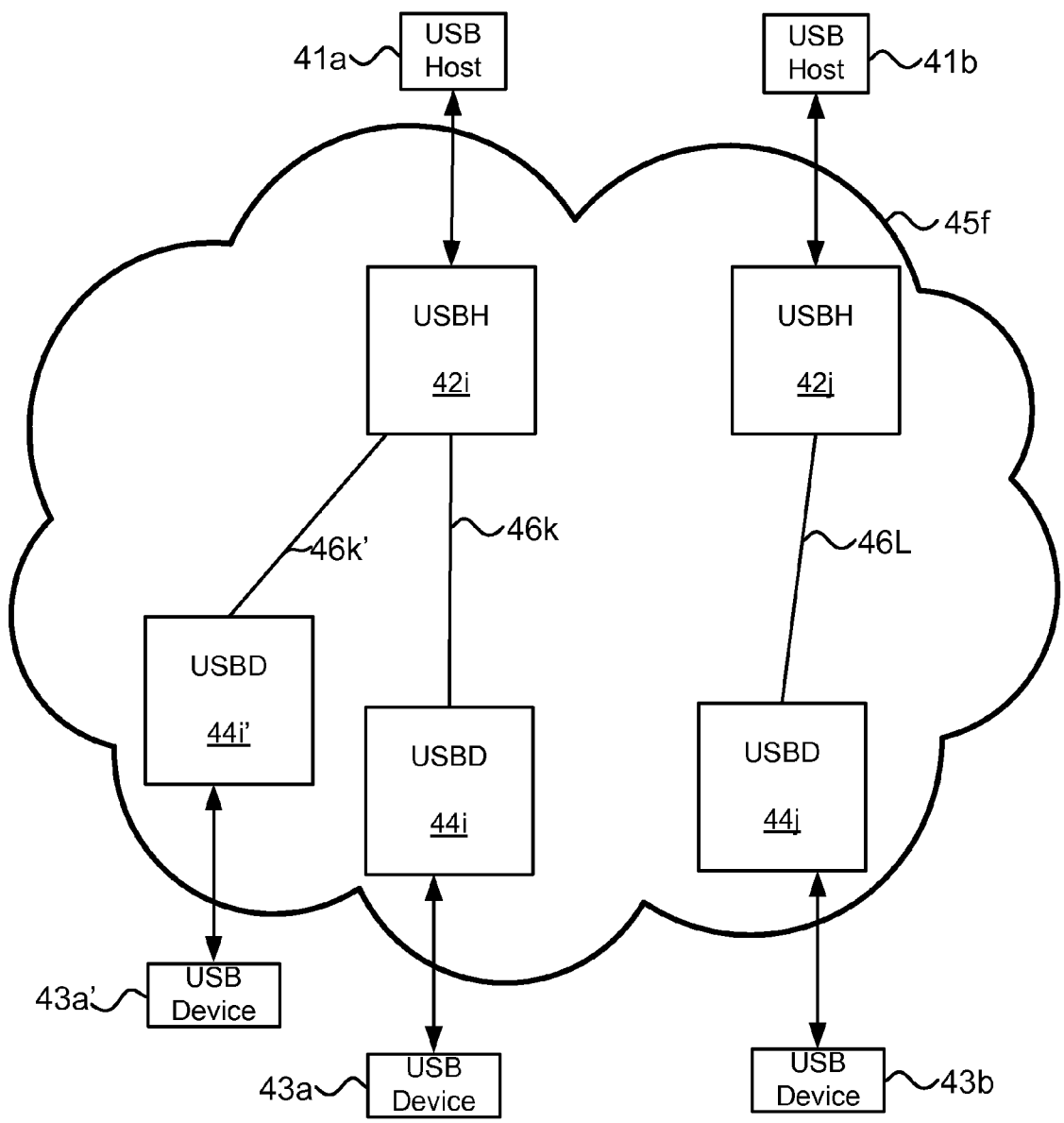
FIG. 4F illustrates one embodiment for addressing, by USB host adaptors, packets conveying USB data over a non-USB network.
Figure 5F:
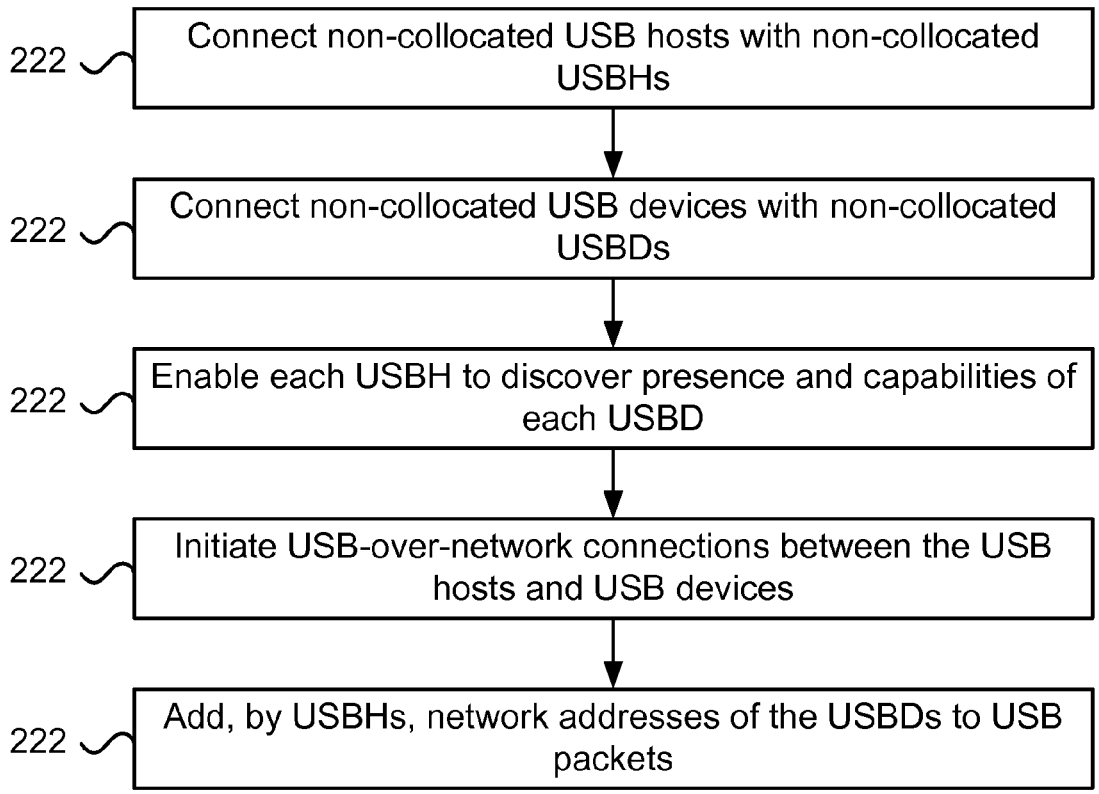
FIG. 5F illustrates one flow diagram for addressing, by USB host adaptors, packets conveying USB data over a non-USB network.

FIG. 4F and FIG. 5F illustrate two related embodiments for addressing, by USB host adaptors, packets conveying USB data over a non-USB network. One of the embodiments includes the following steps: In step 5f1, connecting first and second non-collocated USB hosts 41a, 41b with respective first and second non-collocated USBHs 42i, 42j. The USB hosts communicate with their respective USBHs essentially according to USB specification timings. In step 5f2, connecting first, second, and third non-collocated USB devices 43a, 43a', and 43b with respective first, second, and third non-collocated USBDs 44i, 44i', and 44j, essentially according to USB specification timings. In step 5f3, enabling, by the non-USB network 45f, each USBHs to discover presence and capabilities of each USBDs. The presence and capability discovery operates over a network, and therefore should operate even when at least two network hops separate between the first USBH and the first USBD. In step 5f4 at least three connections are initiated. For example, initiating a first USB-over-network connection between the first USB host 41a and the first USB device 43a; initiating a second USB-over-network connection between the first USB host 41a and the second USB device 43a'; and initiating a third USB-over-network connection between the second USB host 41b and the third USB device 43b. In step 5f5, at least three addresses are added by the USBHs. For example (i) receiving, by the first USBH 42i, information about the first USB device 43a and the first USB-over-network connection. The first USBH 42i is adding the network address of the first USBD 44i to packets conveying USB data from the first USB host 41a to the first USB device 43a. (ii) further receiving, by the first USBH 42j, information about the second USB device 43a' and the second USB-over-network connection. The first USBH 42i is adding the network address of the second USBD 44i to packets conveying USB data from the first USB host 41a to the second USB device 43a'. And (iii) receiving, by the second USBH 42j, information about the third USB device 43b and the third USB-over-network connection; and adding, by the second USBH, network address of the third USBD to packets conveying USB data from the second USB host to the third USB device.

Still referring to FIG. 4F, the embodiment may further include terminating the first USB-over-network connection by the first USBH 42i. Optionally, the first and third USB-over-network connections operate essentially simultaneously and without any common network node. Optionally, the non-USB network may guarantee maximum network latency variation below a first predefined value, and may guarantee maximum round trip latency over the network below a second predefined value. Optionally, the embodiment may further include receiving by the first USBH 42*i* the information about the first USB device 43*a* before connecting with the first USB host 41*a*. Optionally, at least one of the USB-over-network connections is transmitted over a cable longer than 5 m. Optionally, the non-USB network is an HDBaseT network. Optionally, the non-USB network is a packet switching network. Optionally, the non-collocated USBHs are coupled to the non-collocated USB hosts via standard USB cables, and the non-collocated USBDs are coupled to the non-collocated USB devices via standard USB cables. Optionally, the non-USB network may guarantee the throughput of the USB-over-network-data-plane connections. In addition to the throughput, the non-USB network may guarantee maximum network latency variation below 50 microseconds, and maximum round-trip latency below 200 microseconds.

According to USB Specification Revision 2.0, when a USB device is attached to the system, a USB host is responsible for assigning a unique address to the device. The address is assigned after the USB device has been reset by the USB host, and the USB hub port where the USB device is attached has been enabled. The USB Specification does not provide a mechanism for reading the USB device descriptor without connecting the destined USB host to the USB device. Contrary to the USB specification, the disclosed embodiments for partial USB enumeration do provide a mechanism for reading the USB device descriptor without connecting the destined USB host to the USB device.

In one embodiment of partial USB enumeration, each USBD discovers and connects to the USB devices which are connected to it. In order to establish the connection, the USBD acts as a USB host and enumerates the USB devices according to the standard USB enumeration. The USBD may perform the entire enumeration procedure, or a partial enumeration procedure enabling it to read from the device the relevant descriptors. In one embodiment, the USBD distributes the descriptors over the network to the USBHs; alternatively, the USBHs request the descriptors from the USBD (both referred to as forwarding the descriptors). The USBH may use the descriptors for either bus management, and/or to provide information about the device to users/clients and control points in the network. In summary, the USBD runs partial enumeration in order to read the descriptors from the USB devices. Then, the USBD can serve or distribute the descriptors.

From the host side of the network, the USBH can request or receive the USB descriptors obtained by the USBD. Then, the USBH provides the descriptors to its client, such as a user. Using the descriptors, the client is aware of all the USB devices available over the USB network, it can request descriptors from the available USB devices, and can connect to one or more available USB devices.

Figure 6A:
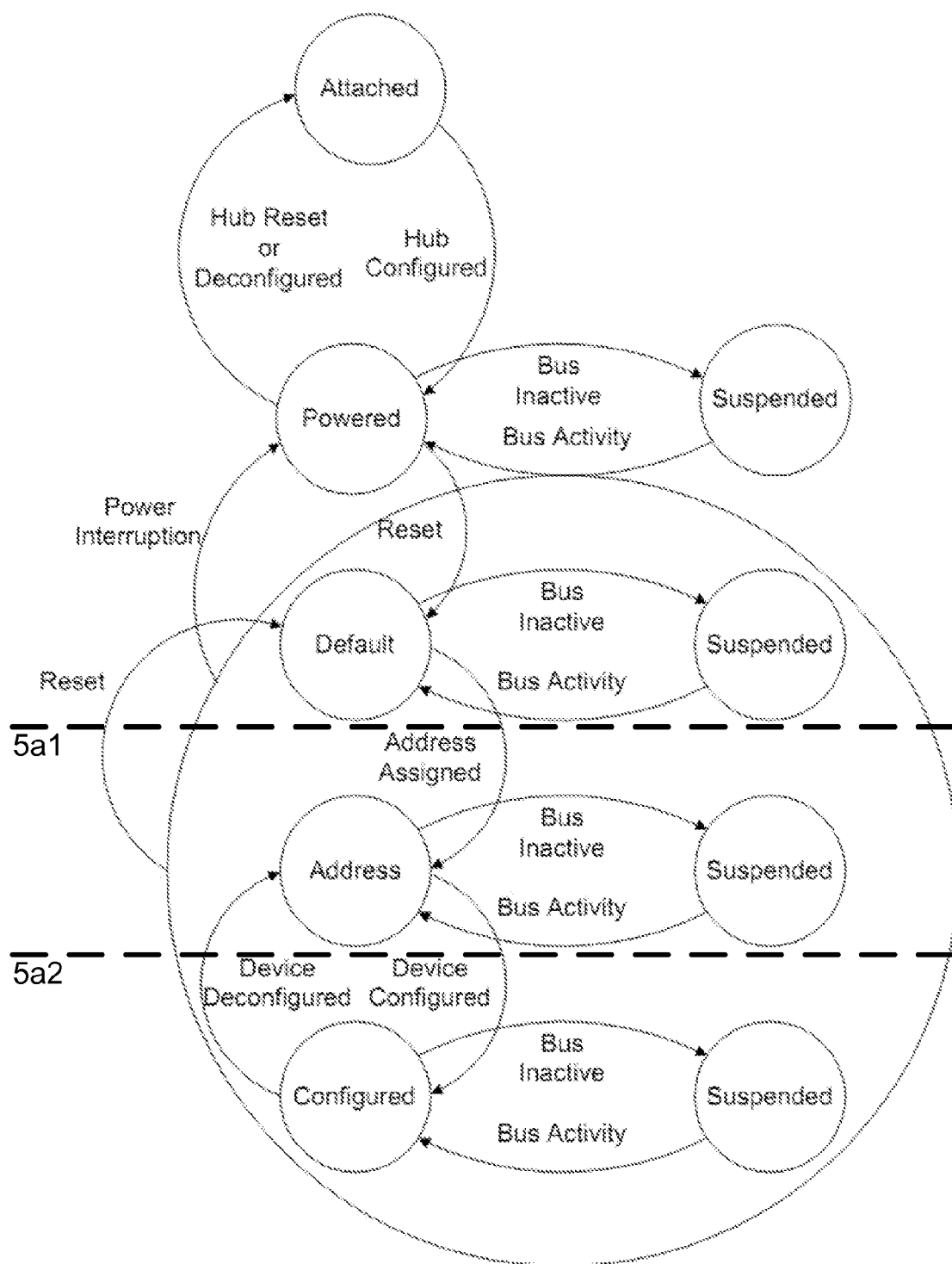
FIG. 6A illustrates possible partial enumeration breakpoints on the USB device state diagram of USB Specification Revision 2.0.
Figure 6B:
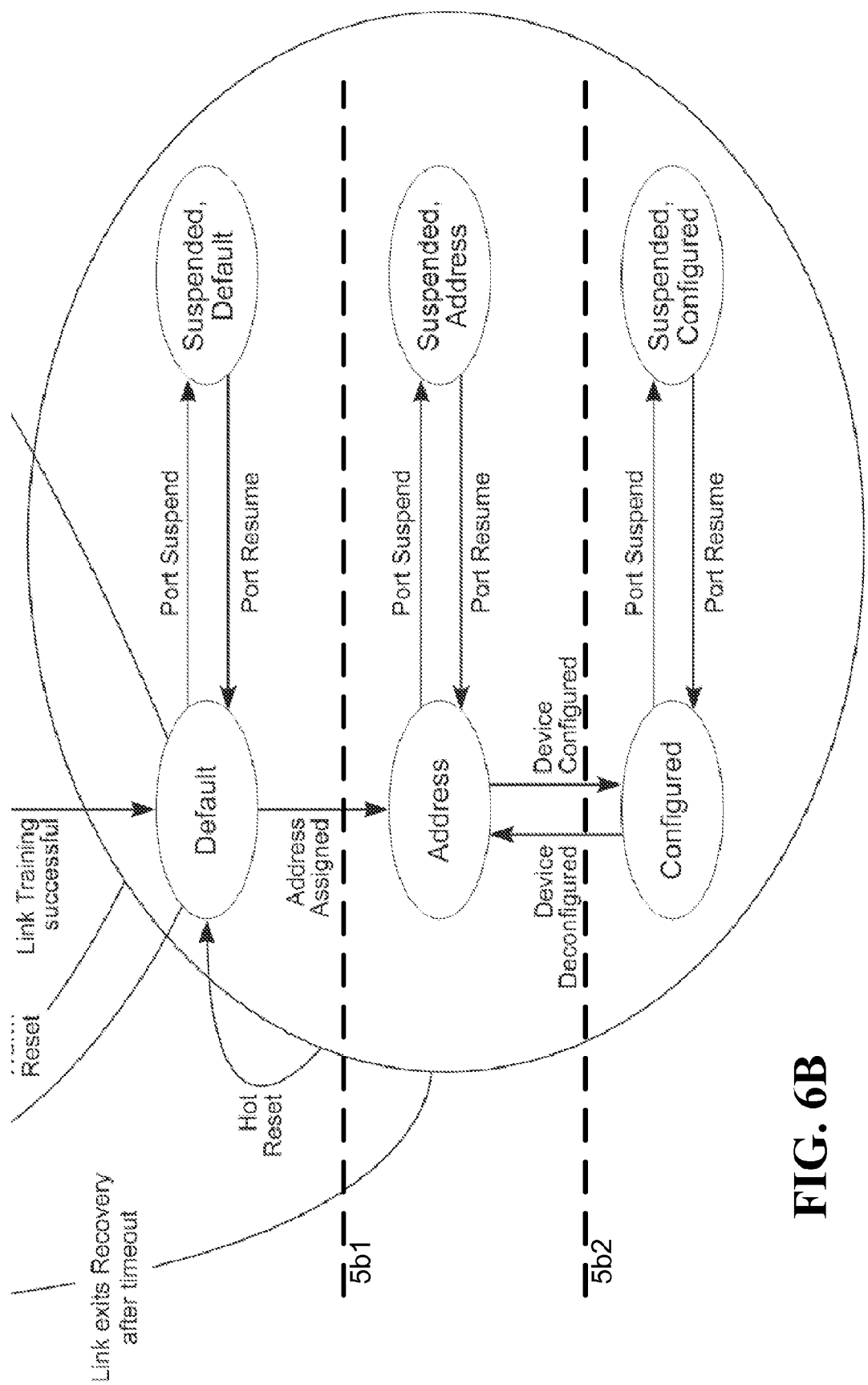
FIG. 6B illustrates possible partial enumeration breakpoints on the USB device state diagram of USB Specification Revision 3.0.

FIG. 6A illustrates possible partial enumeration breakpoints on the USB device state diagram of USB Specification Revision 2.0. FIG. 6B illustrates possible partial enumeration breakpoints on the USB device state diagram of USB Specification Revision 3.0. In one embodiment, the partial enumeration process is applied by a USBD to USB devices connected to its downstream USB port. The USBD has partial USB host functionality enabling it to perform the following steps: (i) Connect to a USB network of hubs and devices via a USB cable connected to a downstream USB port. (ii) Communicate with the devices/hubs connected to it. (iii) For each hub connected to the USBD, the USBD enumerates the hub in order to enable the hub to report to the USBD on USB devices connected and removed from it. The USB devices may be connected to the hub directly or connected via a USB network that may include additional hubs. (iv) For each non-hub USB device connected to the network, the USBD enumerates the USB device until the Address state (i.e., the partial enumeration stops prior to the Configuration state of the USB device), which is indicated by dotted line 5*a*2 on the USB device state diagram of USB Specification Revision 2.0, and is indicated by dotted line 5*b*2 on the USB device state diagram of USB Specification Revision 2.0. At the Address state the USBD may read the USB descriptors from the USB device without requiring a software driver. Alternatively, the USBD may enumerate the USB device until the Default state (i.e., the partial enumeration stops prior to the Addressing state of the USB device), which is indicated by dotted line 5*a*1 on the USB device state diagram of USB Specification Revision 2.0, and is indicated by dotted line 5*b*1 on the USB device state diagram of USB Specification Revision 2.0. However, stopping at the Default state may not enable the USBD to read additional USB devices connected to the USB device having the zero address.

Still referring to the partial enumeration procedure, when a USB host is associated with a USB device, it may either continue with the enumeration process from where the USBD left in order to complete the enumeration procedure, or perform again the entire enumeration procedure.

A benefit of the partial enumeration procedure is that the USB hosts are able to connect to the USB devices after the partial enumeration. Thus, the USB hosts connected to the USB network have data regarding the USB devices available over the USB network—in a dynamic manner—which enables the system to add and remove USB devices dynamically. Phrased alternatively, a USB host is aware of the USB devices only after is it connected to them. On the other hand, utilizing the descriptors obtained through the partial enumeration procedure enable the various USB hosts to be aware of the available USB devices without first connecting to them. This potentially enables all the various USB hosts to be aware of all the USB devices (because they are still unconnected), and then each USB host can decide to which USB device it would like to connect.

Figure 6C:
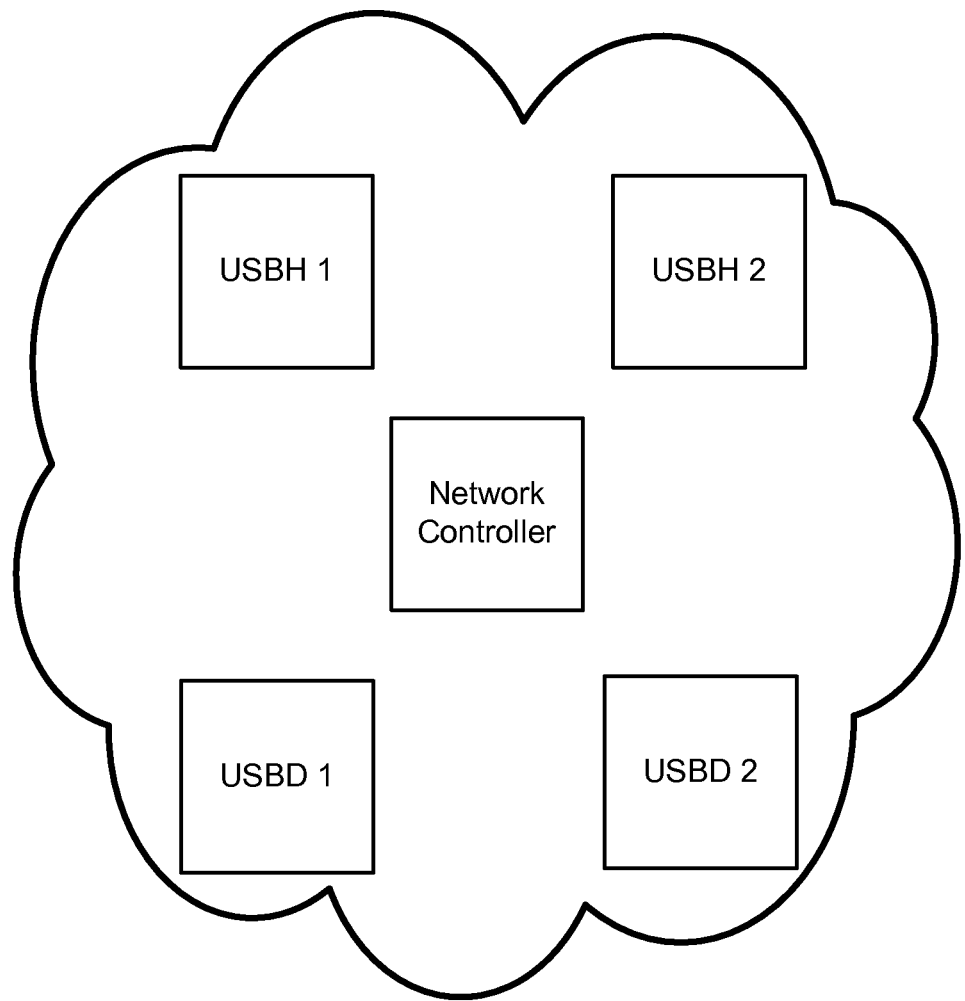
FIG. 6C illustrates an alternative use of partial enumeration.

FIG. 6C illustrates an alternative embodiment where a network controller receives the partial enumeration results from the USBDs, and makes that information available to the USBHs without having to make connections. The resulting system is able to select dynamically the actual connections to be made because the entire information is available at the network controller.

Figure 4G:
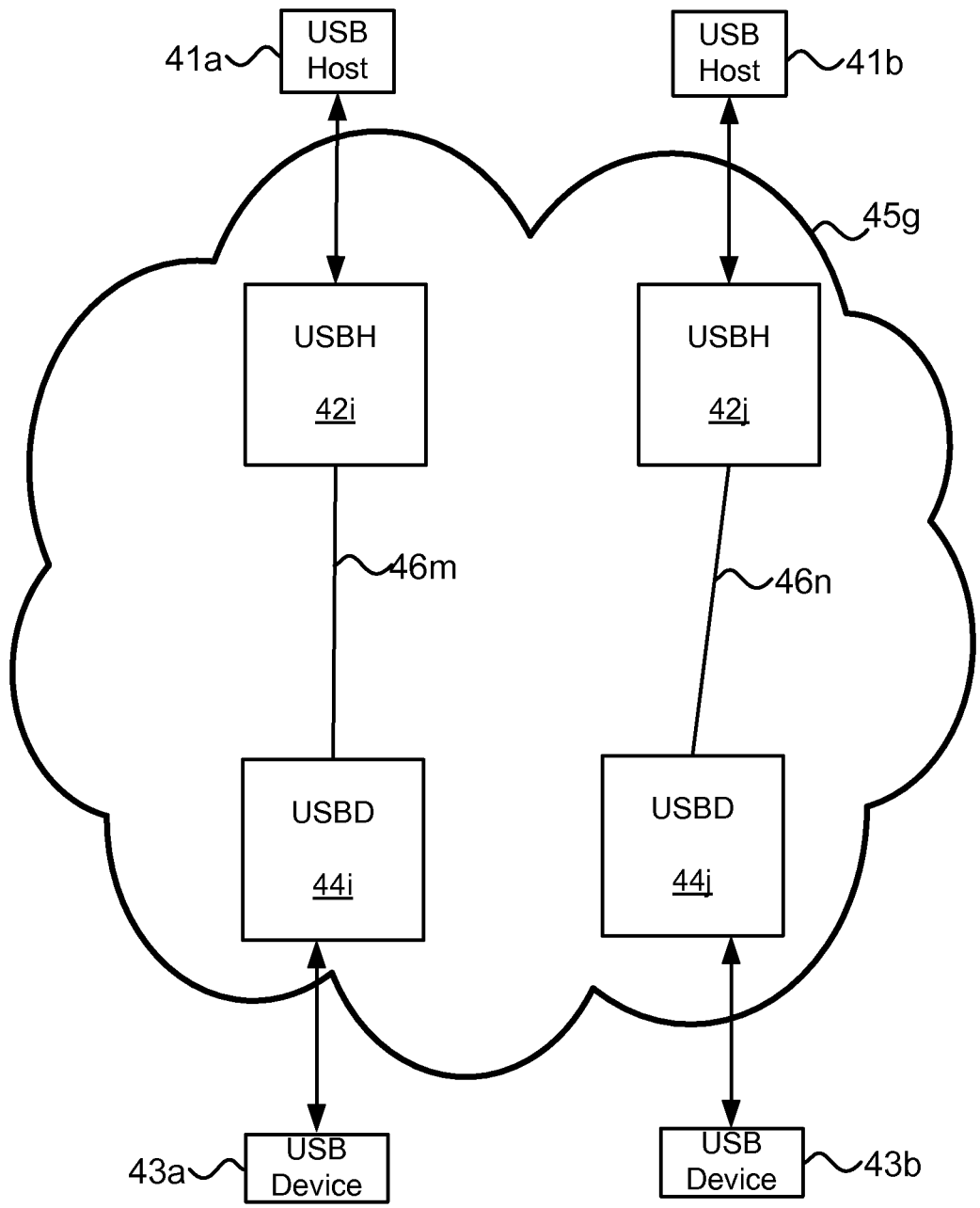
FIG. 4G illustrates one embodiment for initiating a USB-over-network connection based on partial USB enumeration.
Figure 5G:
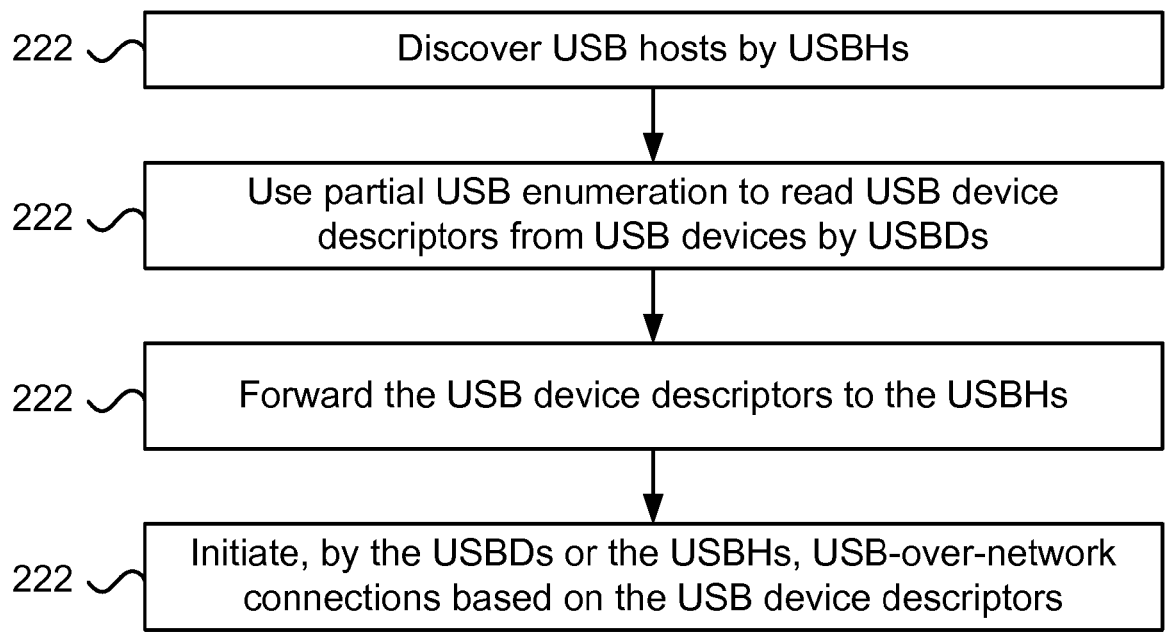
FIG. 5G illustrates one flow diagram for initiating a USB-over-network connection based on partial USB enumeration.

FIG. 4G and FIG. 5G illustrate two related embodiments for initiating a USB-over-network connection based on partial USB enumeration. One of the embodiments includes the following steps: In step 5*g*1, discovering first and second USB hosts 41*a*, 41*b* by respective first and second USBHs 42*i*, 42*j*. In step 5*g*2, reading USB device descriptors of first and second USB devices 43*a*, 43*b* by respective first and second USBDs 44*i*, 44*j* performing partial USB enumeration. The partial USB enumeration process stops prior to the configuration state of the USB devices. In step 5*g*3, forwarding the read USB device descriptors to both the first and second USBHs 42*i*, 42*j*, wherein the USBDs and the USBHs communicate over a network 45*g* that can connect each USBD with each USBH. And in step 5*g*4, initiating USB-over-network connections based on the USB device descriptors. For example, initiating, by the first USBD 44*i* or the first USBH 42*i*, a first USB-over-network connection between the first USB device 43*a* and the first USB host 41*a*, via the first USBH 42*i* and the first USBD 44*i*, and based on the USB device descriptors; and initiating, by the second USBD 44*j* or the second USBH 42j, a second USB-over-network connection between the second USB device 43b and the second USB host 41b, via the second USBH 42j and the second USBD 44j, and based on the USB device descriptors.

Still referring to FIG. 4G, the embodiment may further include operating the first and second USB-over-network connections essentially simultaneously and without any common network node. Optionally, the network 45g includes network control plane and network data plane. The network control plane discovers presence and capabilities of the USBDs, the USBHs, the USB hosts, and the USB devices. The network data plane transports USB data between connected USBDs and USBHs. Optionally, the first USB-over-network connection is a first USB-over-network-data-plane connection. Optionally, the network control plane is initiating the first USB-over-network-data-plane connection. Optionally, terminating the first USB-over-network connection, by the first USBD or the first USBH, via the network control plane. Optionally, the topologies of the network control plane and the network data plane are not the same for the first USB-over-network connection. Optionally, the network includes at least two hops, and the first USBD is initiating the first USB-over-network connection. Optionally, the network includes at least two hops, and the first USBH is initiating the first USB-over-network connection. Optionally, the embodiment may further include performing the partial USB enumeration without connecting the USB devices with any of the USB hosts. Optionally, at least one of the USB-over-network connections is transmitted over a cable longer than 5 m. Optionally, the network is an HDBaseT network. Optionally, the network is a packet switching network. And optionally, the embodiment may further include providing by the network fixed network paths for the USB-over-network connections.

Figure 7:
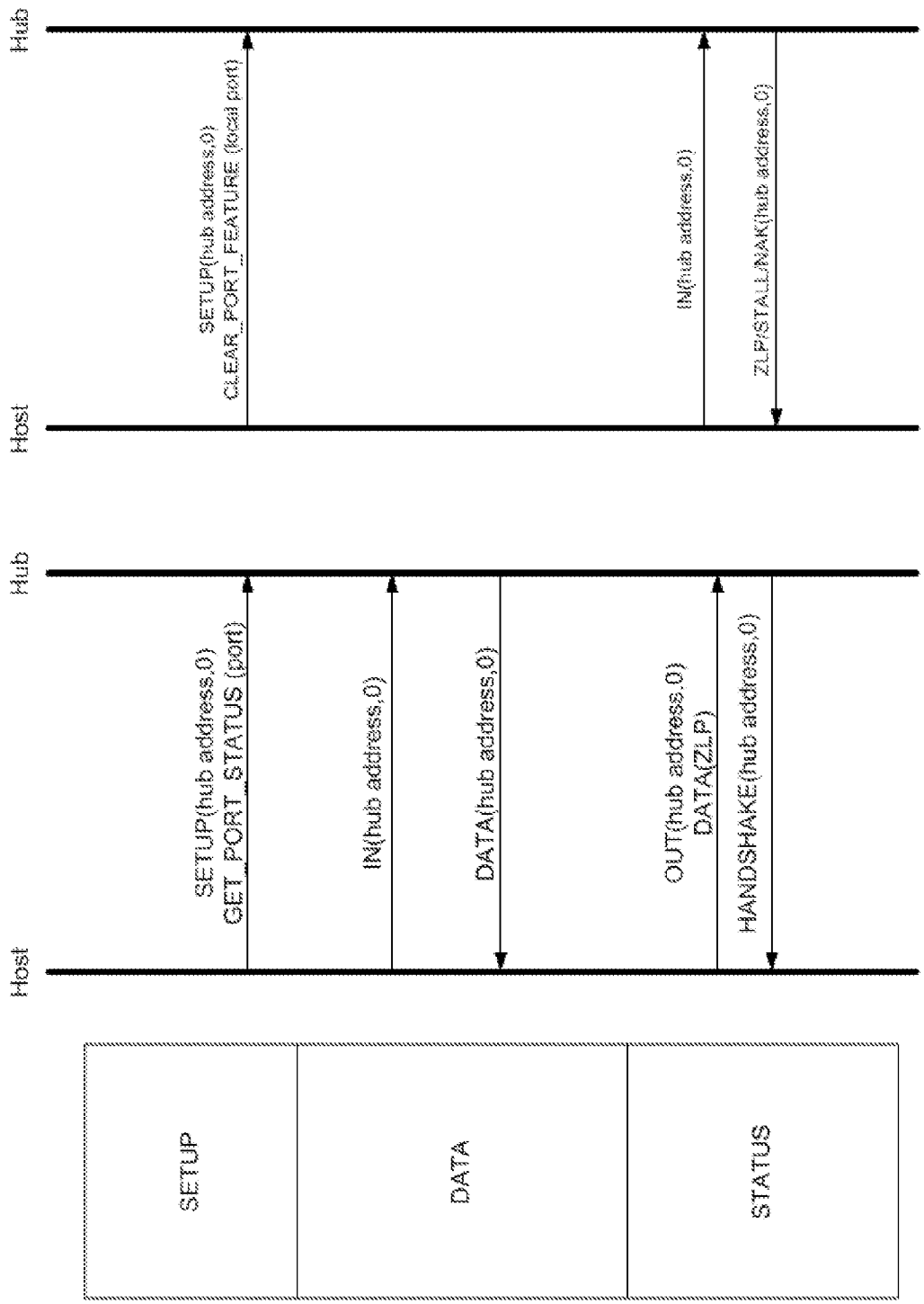
FIG. 7 illustrates one implementation.

In one embodiment, as part of the enumeration procedure, a single hub may communicate with two different USB hosts. Because the hub cannot operate with two hosts, the USBD ensures that only one transaction is performed each time. FIG. 7 illustrates an implementation having a memory, tracking over the steps of the transfer, and when a transfer ends the USBD handles the next transfer. When the memory is full, the USBD rejects new transfers. More specifically, the USBH may send a request to a port of a hub; IN request (e.g. GET_PORT_STATUS); and no data request (e.g. CLEAR_PORT_STATUS). DATA and STATUS stages do not include the local port, need the context of the entire control transfer. If a SETUP token is received in the middle of a control transfer, the previous transfer is abandoned. And for a Multi T-Stream USBD, two USBHs may address the same hub simultaneously; The USBD shall buffer hub request and conduct them one at a time.

In one embodiment, a USBD is connected to at least two USB devices, where each USB device is connected to a different USB host. Since each USB host assigns addresses to its USB devices independently, the two USB devices may bear the same address. To prevent such addressing ambiguity problem, the USBD assigns its own addresses to its USB devices and the USBH or USBD translates the addresses used by the USB hosts to the USBD address space. Similarly, a USB host may address a specific port of the USBH hub, and the USBH hub forwards the message to the actual hub and port connected to the real device.

Figure 6D:
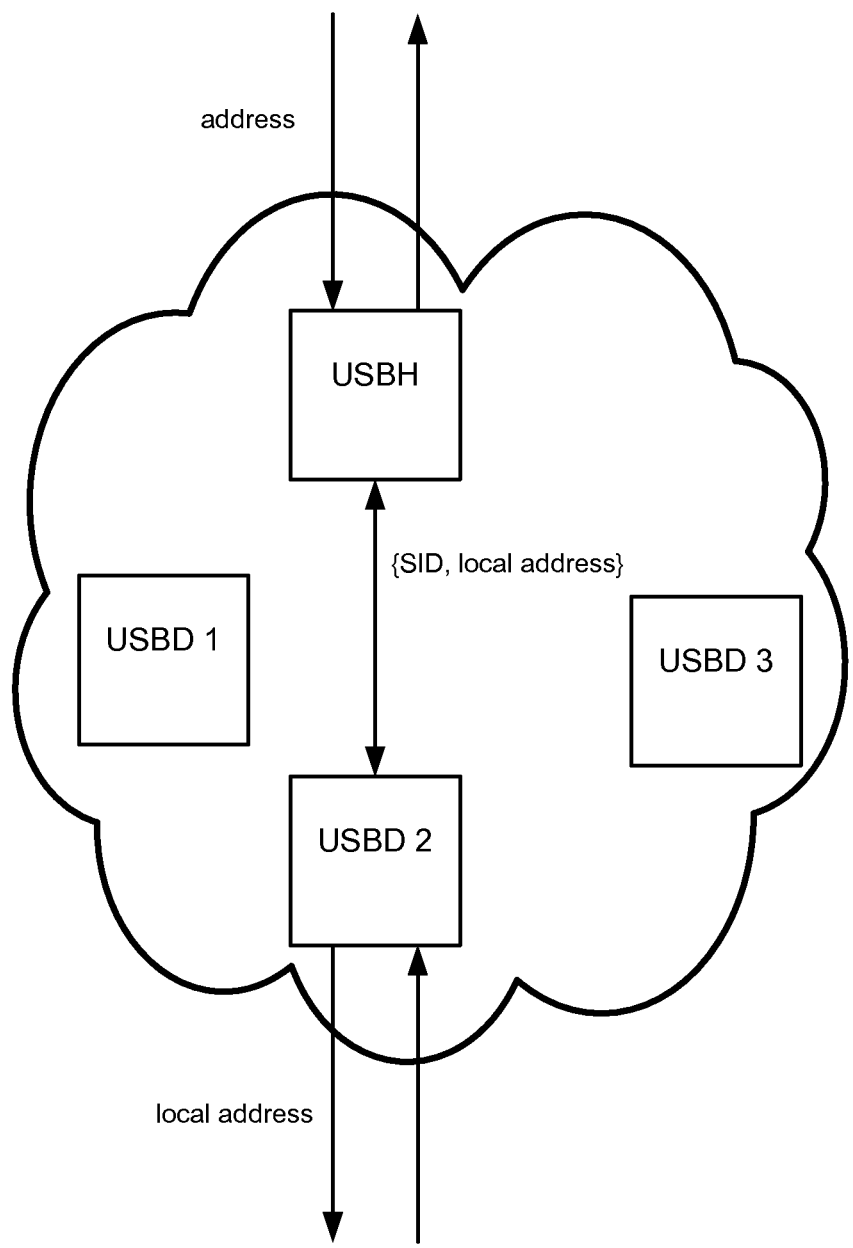
FIG. 6D illustrates one example of a USB device address translation.

FIG. 6D illustrates one example of a USB device address translation. In the downstream direction, the USB host specifies USB address on downstream packets; the USBH translates the address to a USBD ("local") address (and fixes the Token CRC); and the USBD uses the local address. In the upstream direction, the USBD receives a packet in response to a token with a local address; the USBD sends the packet to the appropriate USBH, and the USBH transmits the USB packet in response to a token with the USB address corresponding to the "local" address combination.

Figure 6E:
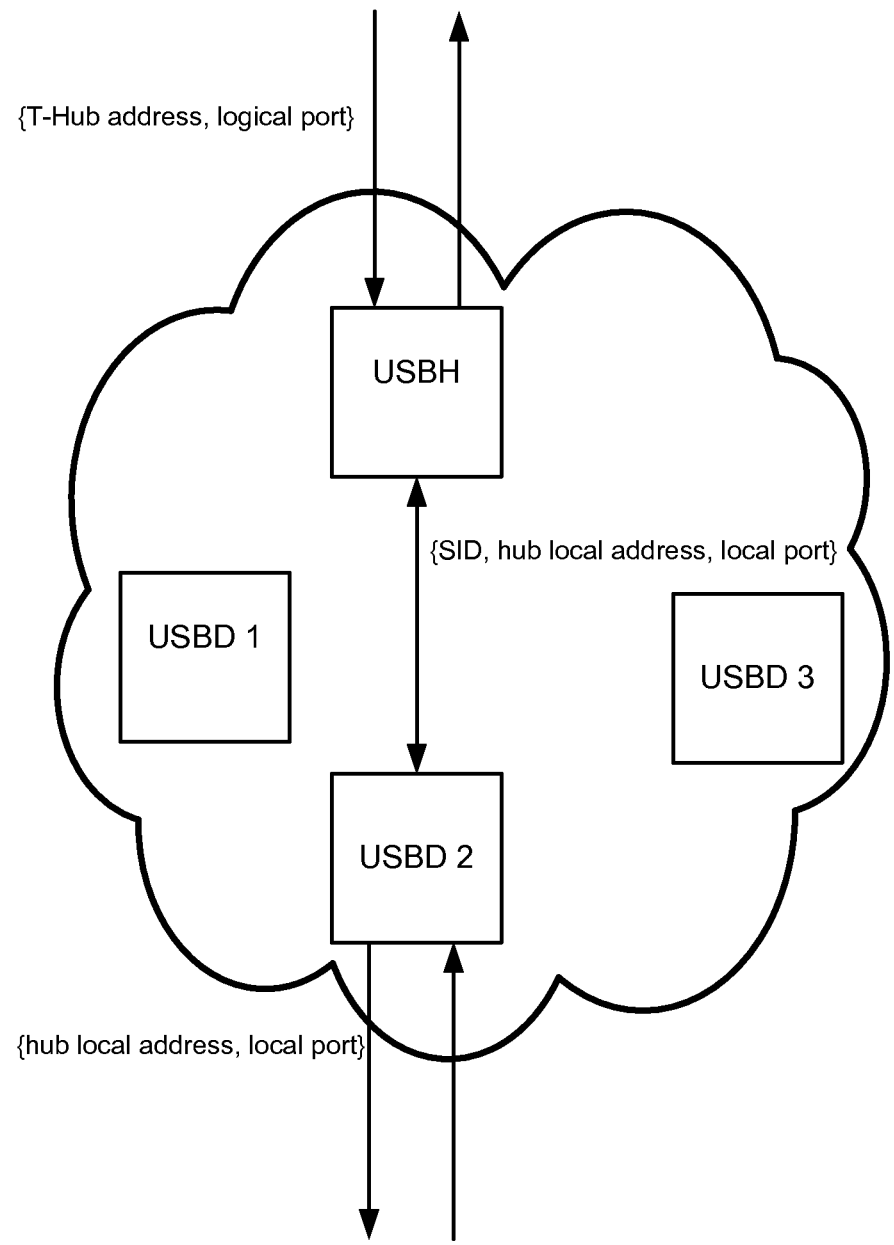
FIG. 6E illustrates one example of translating a specific USBH port command to a corresponding USBD port.

FIG. 6E illustrates one example of translating a specific USBH port command to a corresponding USBD port. This is used for port requests and/or for Split transactions where a hub and a port are addressed. In the downstream direction, the USB host specifies the USBH Hub address and ("logical") port; the USBH translates the [USBH Hub address, logical port] combination to [hub local address, local port] and fixes the CRC; and the USBD uses the hub local address and local port. In the upstream direction, the USBD receives a packet in response to a token with hub local address and local port; the USBD sends the packet to the USBH; and the USBH translates the [hub local address, local port] to [T-Hub address, logical port].

A single hub may communicate with two different USB hosts, each controlling a port connected to a device connected to said host. Each request from a hub needs to follow a protocol comprising a Setup stage, an optional Data stage, and a Status stage. According to the USB specification, if a Setup stage is started in the middle of a previous request, the previous request is abandoned. The USBD buffers request to the hub and assures that each request is completed before another request is started. When the buffer memory is full, the USBD rejects new requests.

USB includes two types of periodic transactions—interrupt transactions and isochronous transactions. For Interrupt transactions, the USB host is required to transact with the USB device at least once per interval requested by the USB device. For Isochronous transactions, the data rate is an important part of the information, and therefore the information should be sent/received at a certain rate. The USB protocol provides a mechanism for synchronizing a USB device and a USB host, which relies on the fact that the device observes the host Microframe clock.

The following embodiment discusses a method for performing periodic USB transactions over a USB network. The method assumes that at least one USBD is connected over a network to at least two hosts, and the network has bounded variable latency. According to the standard USB specification, the USB host is responsible for managing the bus transactions, and divides the time into frames or Microframes. The host sends a special packet at the start of each Microframe. The hubs and devices synchronize to the Microframe clock, which is generated by the host. In one embodiment, the packet arrival time jitter introduced over the network does not enable regeneration of the Microframe clock since the packet arrival time jitter may be greater than the maximum Microframe clock jitter allowed by the USB specification. As a result, the USBD cannot just pass through the Microframe packets, but needs to generate its own Microframe clock as described below.

The following three alternative embodiments are used to determine the clock from the Microframes: (i) The clock frequency is the nominal clock frequency, as determined in the USB specification (1 milli second frames or 0.125 milli second micro frames). While this embodiment may work for interrupt transactions, isochronous transactions may require that the host and device share the same Microframe clock. This may be accomplished by the following second and third alternatives. (ii) The USB estimates the original Microframe clock from the incoming start of frame packets. For example, the USBD measures many intervals between start of frame packets, and calculates the average interval between start of frames. (ii) The USBH measures the Microframe clock, which at the USBH does not include the packet arrival time jitter introduce by the network, and sends the measurement over the network to the USBD. Then the USBD utilizes the received measurement to regenerate the Microframes at the right frequency.

A USB host supplies Microframe clock to the USB bus, and the USB hubs synchronize to the Microframe clock. Isochronous transfers assume that the USB host and device share the same Microframe clock. For the USBD to have the same Microframe clock as the USB host, the USBH measures its Microframe clock and transmits the measurement to the USBD. Then, the USBD adjusts its own generated Microframe clock for the USB device according to the Microframe clock of the respective USB host.

Isochronous endpoints may synchronize on frame number. The USBH also sends its SOF tokens containing the frame number, and the USBD uses the same frame numbers and transmit isochronous transactions in the proper frame number.

Figure 16:
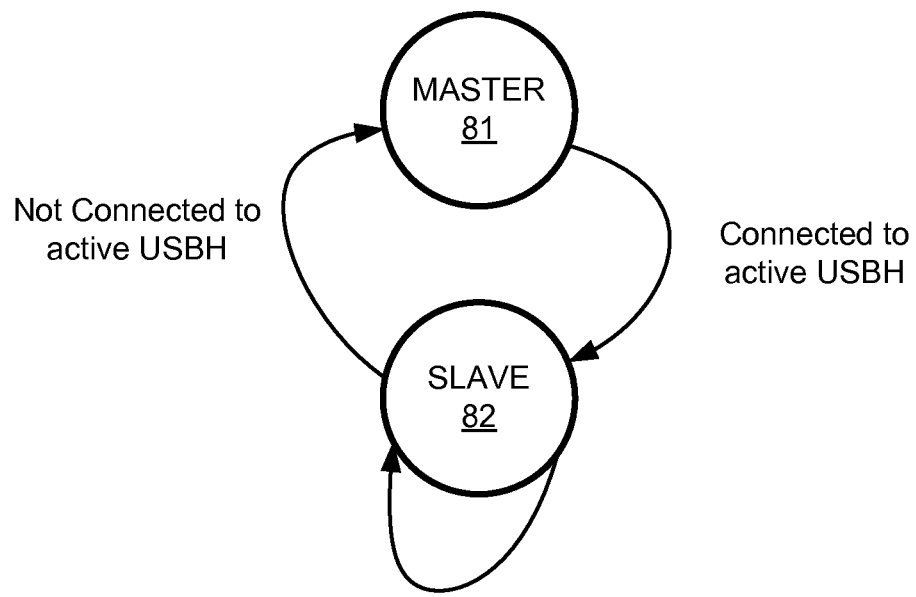
FIG. 16 illustrates USBD states.

The USBD functions as a master or as a slave depending on whether or not it is connected to an active USBH, as illustrated in FIG. 16. As long as the USBD is not connected to any active USBHs, the USBD functions as a master, and uses its own Microframe clock. Once a USBD is connected to an active USBH, the USBD functions as a slave of the USBH master, and the USBD regenerates the Microframe clock of the master. It is noted that Microframes were added to the high speed USB while still maintaining a relationship with the 1 ms frame rate in full speed/low speed. High speed USB uses a 125 us long Microframe which can specify up to 3 isochronous or interrupt transfers per Microframe.

For both interrupt and isochronous transactions, the IN and OUT USB packets, arriving from the USB host via the network, experience packet arrival time jitter induced by the network latency variation. As a result, the packets may not satisfy the rate requirement expected by the USB device, which was designed to operate over a standard USB connection. Therefore, instead of passing through the periodic transaction packets, the USBD retimes the periodic transactions. The following describes on example of retiming the IN and OUT transactions by the USBD.

For an IN transaction (from the USB device to the USB host), the USBD should poll the USB device for data at the rate required by the USB device, and send the received data to the USBH. The USBH buffers the incoming data to absorb the packet arrival time jitter induced by the network. Concurrently, the USB host polls the USBH, and the USBH serves the USB data to the USB host.

In a case where the USBD and USBH operate with the same frequency, such as with isochronous communication, the buffer is long enough to ensure there is no overrun or underrun.

In one embodiment, the USBD and USBH are not frequency locked, for example when the USBD works at the nominal rate and not at the estimated rate, and when the host rate is higher than the device rate the FIFO buffer may be empty and the USBH returns NAK. If the rate of the USBH is lower than the rate of the USBD, the FIFO buffer will be full and the USBH will request the USBD to temporally stop polling the USB device. In one embodiment, the request to stop polling is achieved with a designated message. In another embodiment, the polling is done as long as the USBD receives a designated message from the USBH.

For OUT transactions (from the host to the device), the USBH receives the data from the USB host, and sends it to the USBD. The USBD uses a buffer to store the incoming data. Then it sends it to the devices according to its own scheduled transactions. If the USBD and the USB host are frequency-locked, then a buffer long enough should absorb the network packet arrival time jitter. If the USBD and the USB host are not frequency-locked and there is a frequency difference, then if the rate of the USBD is higher than the USB host, the buffer will get empty, and the USBD will not send data to the device. If the rate of the USB host is higher than the rate of the USBD, the buffer will get full, and the USBD will request the USBH to reply with NAK the next time it receives data in order not to receive additional data until the buffer will forward some of its data and be able to receive said data.

In one embodiment, the above discussed IN and OUT periodic USB transactions are Split transactions. The Split transactions are retimed similarly, while also taking into account the specific scheduling requirements detailed in the USB specification. More specifically, the USB specification requires the USB host to schedule CSPLIT (complete split) transaction in certain Microframes after the corresponding SSPLIT (start split) transaction. The USB specification further prohibits scheduling of SSPLIT and CSPLIT transactions in certain Microframes. Without rescheduling these transactions, the packet arrival time jitter introduced by the network may cause a violation of the USB specification requirements. Therefore, the embodiment of independently scheduling the Split transactions, by the USBD, takes into consideration the USB specification requirements without relying on certain delay properties of the network.

Figure 10:
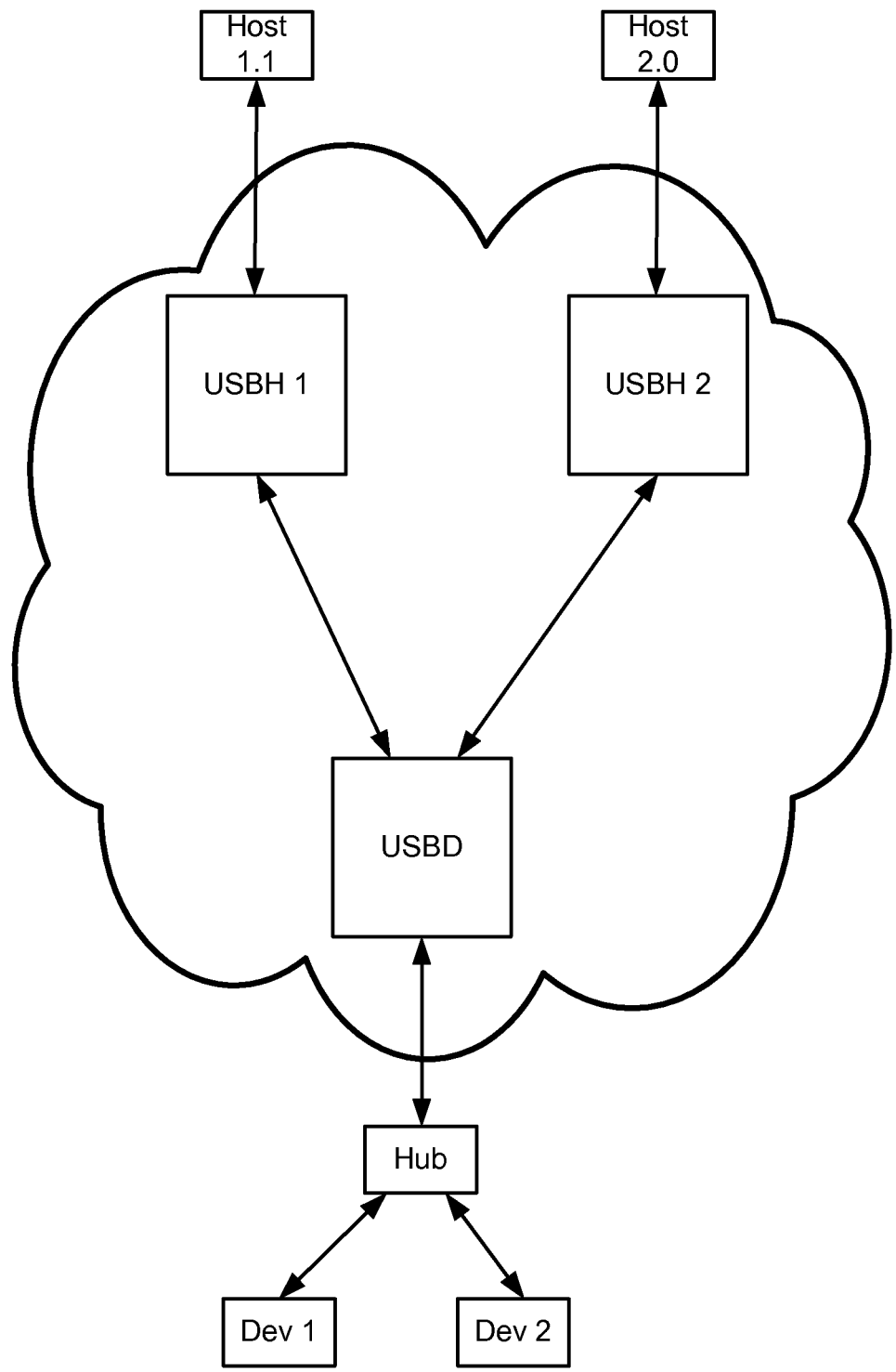
FIG. 10 illustrates a hub connected to two USB devices.

FIG. 10 illustrates a hub connected to two USB devices, where each USB device communicates with a different USB host, where one USB host is a high speed host (USB 2.0 host) and the other USB host is a Full speed host (USB 1.1 host).

The USBD connected to the network preferably works in high speed, and high speed capable devices (connected via USB 2.0 hubs) will communicate in high speed. The USBH may be connected to a USB 1.1 host, which operates in full speed. In this case, it is still possible to connect the USB 1.1 host to FS/LS (full speed/low speed) devices connected to the USBD. In one embodiment, if the USB device is connected to the USBD via a hub, the transaction that originates at the USB host as a regular FS/LS transaction is converted to a HS (high speed) split transaction, since the USBD operates the bus at high speed. In another embodiment, the USBD is made to work in FS/LS when it is connected to a USB 1.1 host. However, in this case the USBD would not be able to operate with other high speed hosts.

The following are implementation examples of periodic and non-periodic transactions. For a periodic transaction, the USBD schedules the required Split transactions as described before. For non-periodic transactions, the USB host issues a regular transaction, either the USBH or the USBD translates the transaction into a Start Split transaction, followed sometime later by a Complete Split transaction, whose result is to be returned to the USB host.

In one embodiment, each USB host may comply with the USB specification, while the combination of both USB hosts may not comply with the requirements of the USB specification. In order to solve such incompliance, the USBD substantially independently schedules the communications to accommodate both USB hosts bandwidth requirements and the USB specification requirements. For example, USB host A requires 70% bandwidth of micro frame #1, and USB host B requires 70% bandwidth of the same micro frame #1. As a result, without rescheduling, the USBD would not be able to accommodate the requirements. Therefore, the USBD reschedules the requests to accomplish the transmissions.

In one embodiment, the following method is used for a hub and port status change notification: (i) The USB host polls the USBH Hub for status. (ii) The USBH keeps a Hub and Port Status Change Bitmap; The USBH returns its local bitmap. (iii) The USBD queries DS hubs periodically and sends messages to the USBHs with relevant Port Status Change Information. (iv) The USBH updates its local bitmap (except for ports that are in virtual connection process). And (v) When a USBH sends a request to a port of a hub: after a successful Status Stage of the request, the USBD re-queries the Hub and Port Status Change Bitmap and sends the result before the status stage successful handshake; and the USBH updates its local bitmap.

Figure 8:
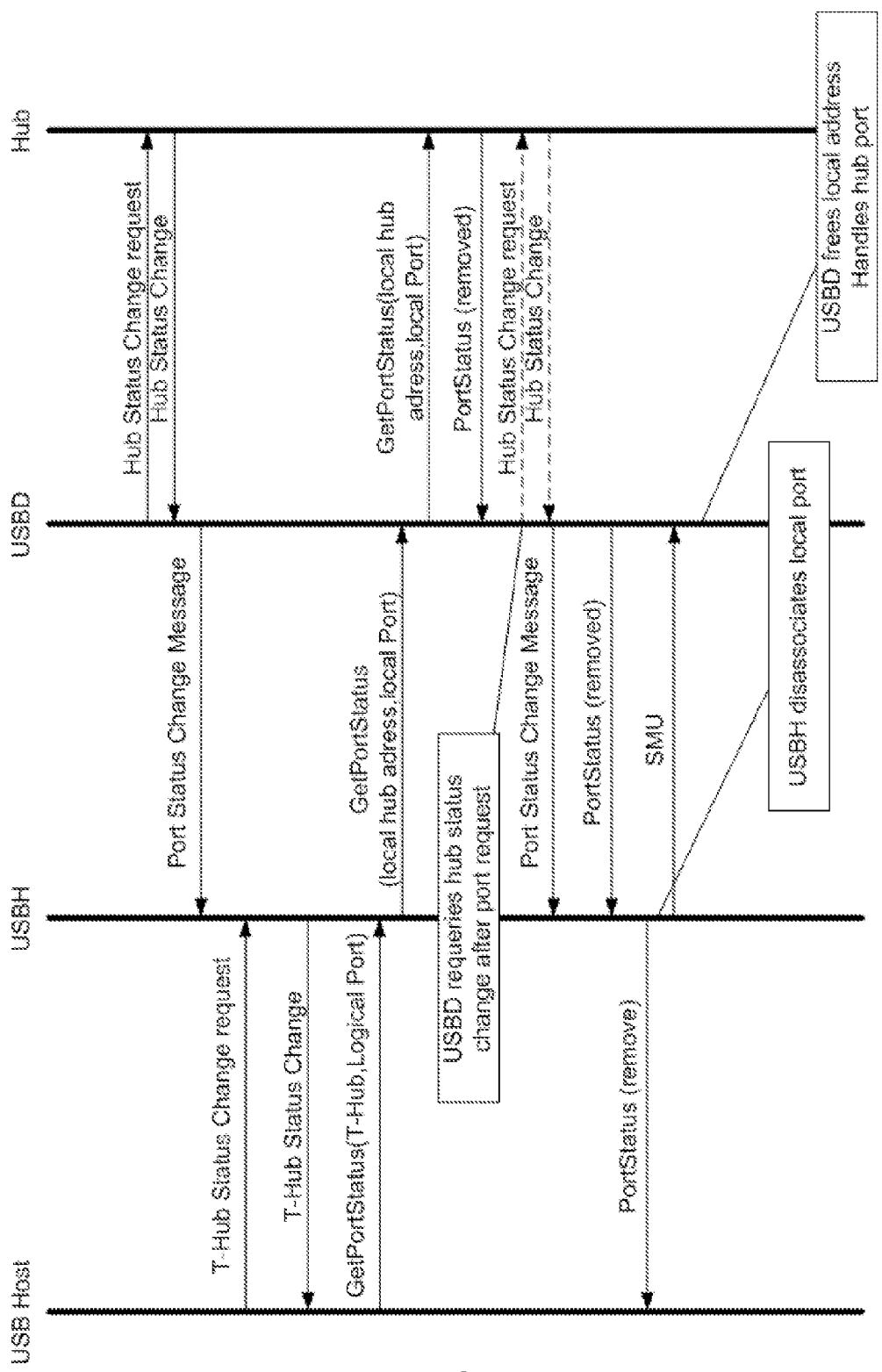
FIG. 8 illustrates one embodiment of a USB device removal.

FIG. 8 illustrates one embodiment of a USB device removal, comprising the steps of: (i) USBH monitors Port Status request response indicating the physical removal of a USB device, (ii) the USBH acts toward the USB host as if it is a hub and the device was removed from its port, and (iii) USBH sends a message to the USBD indicating the removal of the device from the USB host (SMU in FIG. 8).

In one embodiment, a method for disconnecting a USB device from a USB host without its physical disconnection, comprising the following steps: receiving an authorized request to remove a device from a host; The USBH manages the removal procedure as if it is a hub and the device was physically removed from its port; The USBH sends a message indicating the removal of the device to the USBD (SMU in FIG. 8); And the USBD takes charge of the port (repeats the partial enumeration process).

Figure 9:
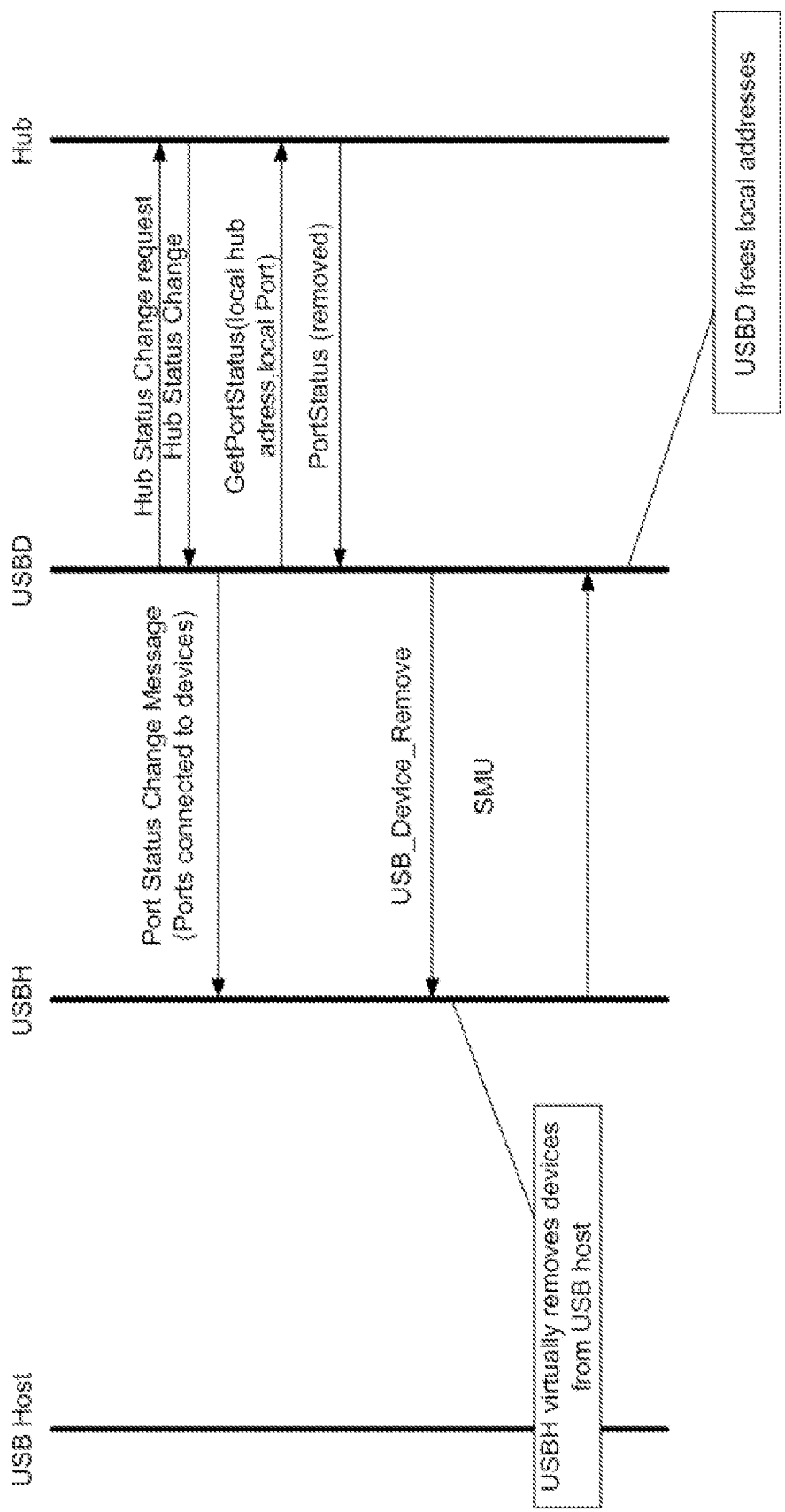
FIG. 9 illustrates the process of disconnecting a hub that also causes disconnection of all devices located downstream to it.

FIG. 9 illustrates the process of disconnecting a hub that also causes disconnection of all devices located downstream to it. In this embodiment, the USBD sends to the USBH a message indicating all the devices that need to be removed from the USB host connected to the USBH. The USBH proceeds to disconnect the devices one by one as described before, and sends a message to the USBD (SMU in FIG. 9). For non-periodic transaction (bulk/control), the USB protocol uses data toggling and ACK response to ensure that all data packets sent are indeed received as detailed in the USB specification. To ensure that no data packets are lost by the network the USBD and USBH extend this mechanism to the communication between the USBD and USBH.

Figure 11:
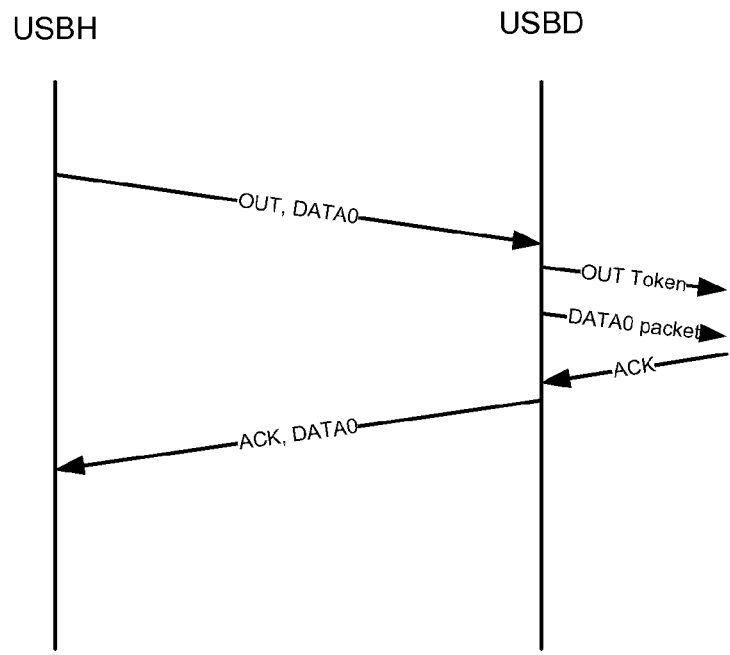
FIG. 11 illustrates an OUT transaction where the USBH sends the USBD a DATA0/1 USB packet.

FIG. 11 illustrates an OUT transaction where the USBH sends the USBD a DATA0/1 USB packet. When the USBD receives a response (ACK/NAK/NYET/STALL) from the appropriate USB device, it will forward the response along with the original data token (DATA0/1) signaling whether the response is for a DATA0 or DATA1 packet. If the USBH fails to receive a response within a predefined time, it resends the data packet. This mechanism ensures that if a packet is missing or corrupted by the network, it will be resent. Appending the DATA0/1 token to the response ensures that there will be no "false-ACK" where an ACK intended to a previous packet is understood by the USBH to apply for a different packet.

Figure 12:
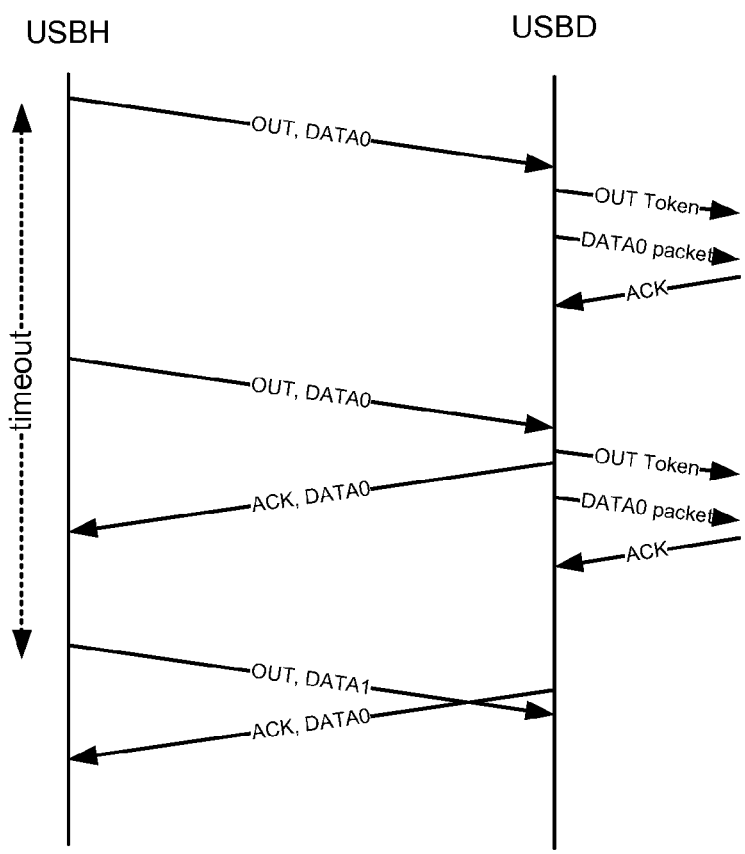
FIG. 12 illustrates a situation where a DATA0 packet is sent, the response is delayed beyond the timeout period, and the USBH resends the DATA0 packet.

FIG. 12 illustrates a situation where a DATA0 packet is sent, the response is delayed beyond the timeout period, and the USBH resends the DATA0 packet. The ACK intended for the first send trial is received and the USBH sends the next data packet DATA1, which is lost/corrupted by the network. Then, the ACK intended for the second trial of the DATA0 packet is received. If DATA0 token were not appended to the ACK, the USBH could mistakenly determine that the ACK response is for the DATA1 packet.

Figure 13:
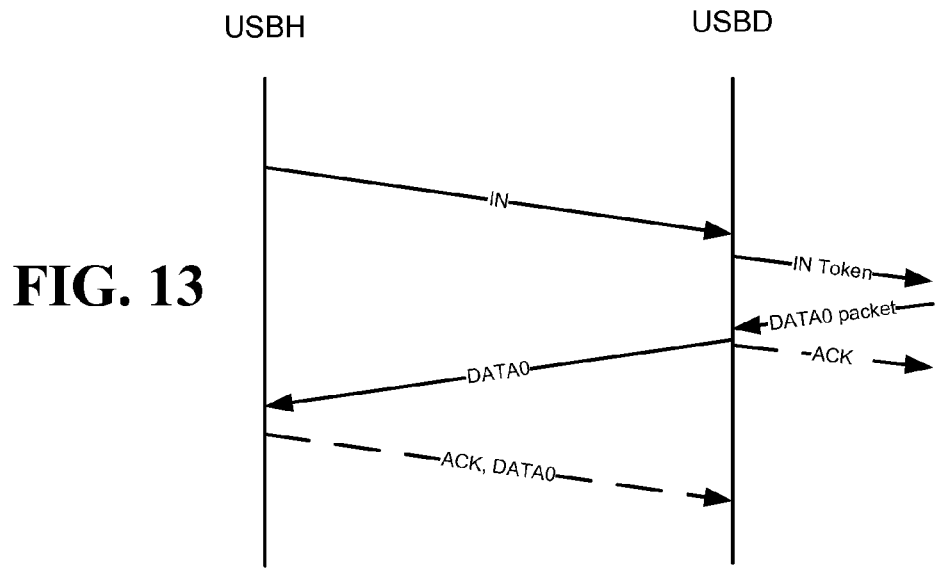
FIG. 13 illustrates an IN transaction.

FIG. 13 illustrates an IN transaction where the USBH sends an IN token to the USBD, the USBD responds to the USBH with a DATA0/1 USB packet, the USBH checks that the packet is valid and sends an ACK response along with the original data token (DATA0/1) signaling whether the response is for a DATA0 or DATA1 packet. When the USBD receives the ACK response, it checks that the data toggle is appropriate and discards the sent DATA packet. If the USBH fails to receive a response within a predefined time, it resends the IN token. If the USBD does not receive an ACK response to a DATA packet, it will resend it as a response to the next IN token. This mechanism ensures the retransmission of a packet that is missing or corrupted over the network. Appending the DATA0/1 token to the response ensures that there will be no "false-ACK" where an ACK intended to a previous packet is understood by the USBD to apply for a different packet.

Figure 14:
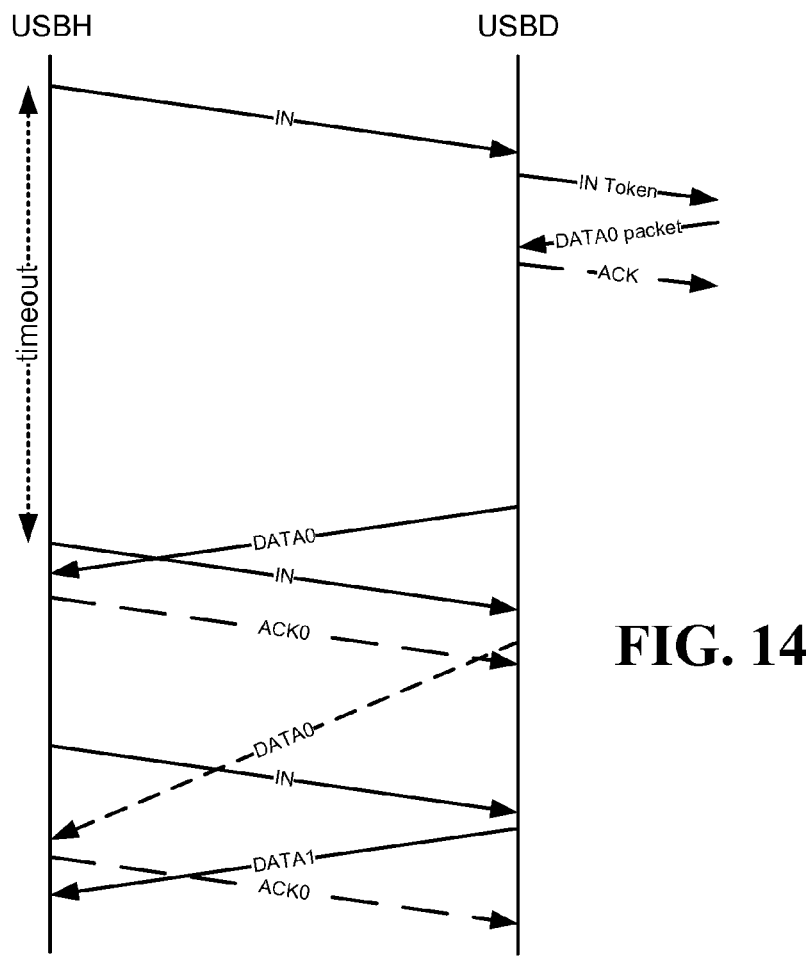
FIG. 14 illustrates delayed incoming DATA0 causing the USBH to resends IN token.

FIG. 14 illustrates a situation where an IN token is sent, the incoming DATA0 packet is delayed beyond the timeout period, and the USBH resends the IN token. Then the original DATA0 packet is received and the USBH sends an ACK response with a DATA0 indication. The USBD receives the second IN token without receiving an ACK for the first DATA0 packet sent, and resends the DATA0 packet. It then receives the ACK intended for the first send trial, and when the next IN token arrives it sends the next data packet (DATA1), which is lost/corrupted by the network. The USBH receives the resent DATA0 packet and responds with a second ACK response with DATA0 indication. This ACK response is then received by the USBD. If the DATA0 token were not appended to the ACK, the USBD could mistakenly determine that the ACK response is for the DATA1 packet.

Figure 15:
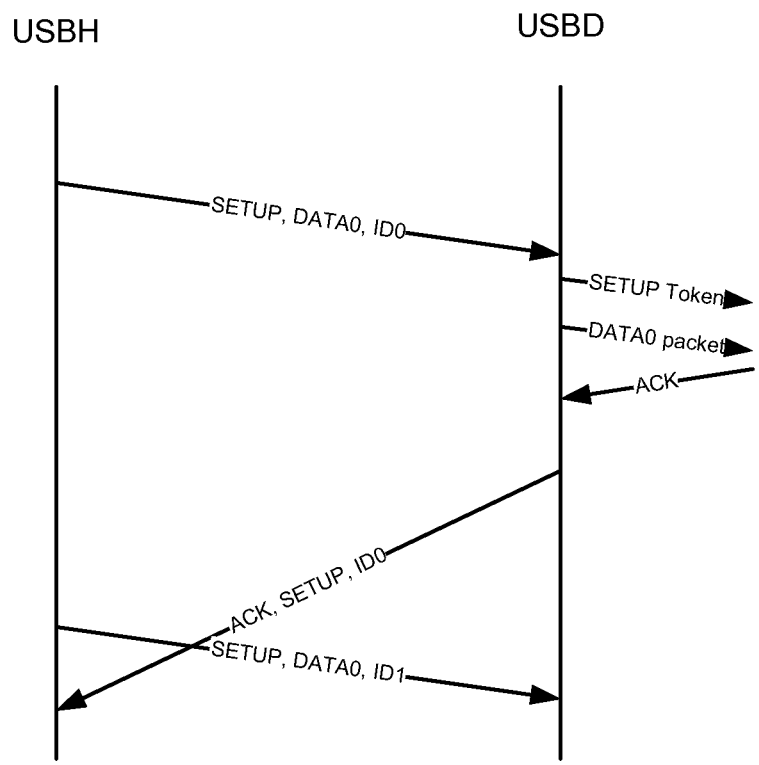
FIG. 15 illustrates one embodiment.

Control transfers are composed of a Setup stage, an optional Data stage and a Status stage. According to the USB specification, if a Setup stage is started in the middle of a previous control transfer, the previous transfer is abandoned. For SETUP tokens the USBH will also send to the USBD a unique identifier. This identifier will be appended to the ACK response sent by the USBD to the USBH to ensure that the USBH matches the ACK response to the correct SETUP token. FIG. 15 illustrates a situation where the USBH sends a first SETUP token with an identifier 1D0, the USBD forwards the ACK response from the device to the USBH, but before it is received by the USBH, the USBH sends to the USBD a second (different) SETUP token intended for the same device and is lost/corrupted by the network. The USBH then receives the ACK response intended for the first SETUP token. If it did not carry the ID0 identifier, the USBH could mistakenly take the ACK response to apply for the second SETUP token.

In one embodiment, the mechanism detailed for Non-Periodic transactions is used for Interrupt transactions. In this case, the mechanism limits the bandwidth since for each data packet sent the system waits for the ACK response before sending the next packet (round trip network delay). In order to avoid this limit, the transmitter sends available data with a sequential identifier; and the receiver signals the transmitter on successful packet reception (ACK) and optionally on missing/corrupt packets (NAK) by sending an ACK/NAK response with the appropriate sequential identifier. The transmitter buffers the sent packets until an appropriate ACK response is received. The transmitter resends the missing packet(s) if an ACK response is received for a later sent packet without an ACK response previously received for an earlier sent packet, or if a NAK response is received. The receiver also buffers the received packets, and if a packet is corrupt/missing according to the sequential identifier sequence it will wait for the missing packet to be resent to it before forwarding any packets which are later in the sequence than the missing packet.

For Interrupt IN transactions, if the buffer in the USBH is full, it signals the USBD to stop polling the device for additional data packets. And if the USBD buffer is full, it will stop polling the device for additional data packets. In Interrupt OUT transactions, if the buffer in the USBH is full, it will NAK any additional incoming DATA packets. And if the buffer in the USBD is full, it will signal the USBH to NAK any additional incoming DATA packets. The signaling between the USBD and the USBH can be accomplished by sending a message requesting to stop the polling or accept data, or by avoiding sending a message requesting to continue polling or accepting data.

In this description, references to "one embodiment" mean that the feature being referred to may be included in at least one embodiment of the invention. Moreover, separate references to "one embodiment" or "some embodiments" in this description do not necessarily refer to the same embodiment.

The invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and do not necessarily correspond to discrete hardware elements.

While the methods disclosed herein have been described and shown with reference to particular steps performed in a particular order, it is understood that these steps may be combined, sub-divided, or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when an interface is disclosed in one embodiment, the scope of the embodiment is intended to also cover the use of multiple interfaces. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications, and variations will be apparent to those skilled in the art. It is to be understood that other embodiments may be utilized and structural changes may be made without departing from the scope of the embodiments.

Accordingly, it is intended to embrace all such alternatives, modifications, and variations that fall within the spirit and scope of the appended claims and their equivalents.

What is claimed is:

1. A method for initiating a USB-over-network connection based on partial USB enumeration, comprising:
    discovering first and second USB hosts by respective first and second USB host adaptors (USBHs);
    reading USB device descriptors of first and second USB devices by respective first and second USB device adaptors (USBDs) performing partial USB enumeration that stops prior to the configuration state of the USB devices;
    forwarding the read USB device descriptors to both the first and second USBHs, wherein the USBDs and the USBHs communicate over a network which can connect each USBD with each USBH;
    initiating, by the first USBD or the first USBH, a first USB-over-network connection between the first USB device and the first USB host, via the first USBH and the first USBD, and based on the USB device descriptors; and
    initiating, by the second USBD or the second USBH, a second USB-over-network connection between the second USB device and the second USB host, via the second USBH and the second USBD, and based on the USB device descriptors.

2. The method of claim 1, wherein the network comprises network control plane and network data plane; the network control plane configured to discover presence and capabilities of the USBDs, the USBHs, the USB hosts, and the USB devices; the network data plane configured to transport USB data between connected USBDs and USBHs.

3. The method of claim 2, wherein the first USB-over-network connection is a first USB-over-network-data-plane connection.

4. The method of claim 3, further comprising initiating the first USB-over-network-data-plane connection via the network control plane.

5. The method of claim 2, further comprising terminating the first USB-over-network connection, by the first USBD or the first USBH, via the network control plane.

6. The method of claim 2, wherein topologies of the network control plane and the network data plane are not the same for the first USB-over-network connection.

7. The method of claim 1, further comprising operating the first and second USB-over-network connections essentially simultaneously and without any common network node.

8. The method of claim 1, wherein the network includes at least two hops, and the first USBD is initiating the first USB-over-network connection.

9. The method of claim 1, wherein the network includes at least two hops, and the first USBH is initiating the first USB-over-network connection.

10. The method of claim 1, further comprising performing the partial USB enumeration without connecting the USB devices with any of the USB hosts.

11. The method of claim 1, wherein at least one of the USB-over-network connections is transmitted over a cable longer than 5 m.

12. The method of claim 1, wherein the network is an HDBaseT network.

13. The method of claim 1, wherein the network is a packet switching network.

14. The method of claim 1, further comprising providing by the network fixed network paths for the USB-over-network connections.

15. A network configured to initiate a USB-over-network connection based on partial USB enumeration, comprising:
    first and second USB host adaptors (USBHs) configured to discover first and second USB hosts, respectively;
    first and second USB device adaptors (USBDs) configured to read USB device descriptors of first and second USB devices, respectively, by performing partial USB enumeration that stops prior to the configuration state of the USB devices;

the first and second USB device adaptors (USBDs) further configured to forward the USB device descriptors to both the first and second USBHs, wherein the USBDs and the USBHs communicate over a network which can connect each USBD with each USBH;

the first USBD or the first USBH configured to initiate a first USB-over-network connection between the first USB device and the first USB host, via the first USBH and the first USBD, and based on the USB device descriptors; and the second USBD or the second USBH configured to initiate a second USB-over-network connection between the second USB device and the second USB host, via the second USBH and the second USBD, and based on the USB device descriptors.

16. The network of claim 15, wherein the network comprises network control plane and network data plane; the network control plane configured to discover presence and capabilities of the USBDs, the USBHs, the USB hosts, and the USB devices; the network data plane configured to transport USB data between connected USBDs and USBHs.

17. The network of claim 16, wherein the first USB-over-network connection is a first USB-over-network-data-plane connection.

18. The network of claim 16, wherein topologies of the network control plane and the network data plane are not the same for the first USB-over-network connection.

19. The network of claim 15, wherein the first and second USB-over-network connections operate essentially simultaneously and without any common network node.

20. The network of claim 15, wherein the network includes at least two hops, and the first USBD is configured to initiate the first USB-over-network connection.

21. The network of claim 15, wherein the network includes at least two hops, and the first USBH is configured to initiate the first USB-over-network connection.

22. The network of claim 15, wherein at least one of the USB-over-network connections is transmitted over a cable longer than 5 m.

23. The network of claim 15, wherein the network is an HDBaseT network.

24. The network of claim 15, wherein the network is a packet switching network.

25. The network of claim 15, wherein the network is configured to provide fixed network paths for the USB-over-network connections.

* * * * *